United States Patent [19]

Kellett et al.

[11] Patent Number: 5,747,440

[45] Date of Patent: May 5, 1998

[54] LAUNDRY DETERGENTS COMPRISING HEAVY METAL ION CHELANTS

[75] Inventors: Patti Jean Kellett; Eugene Paul Gosselink; Christopher Mark Perkins, all of Cincinnati, Ohio

[73] Assignee: Procter & Gamble Company, Cincinnati, Ohio

[21] Appl. No.: 594,073

[22] Filed: Jan. 30, 1996

[51] Int. Cl.$^6$ ............................................. C11D 3/26
[52] U.S. Cl. .................... 510/276; 510/467; 510/480; 510/499; 510/501; 510/502
[58] Field of Search ............................. 510/276, 350, 510/499, 501, 502, 467, 480

[56] References Cited

U.S. PATENT DOCUMENTS

| | | | |
|---|---|---|---|
| 3,650,962 | 3/1972 | Werdehausen et al. | 251/102 |
| 3,686,128 | 8/1972 | Werdehausen | 252/99 |
| 3,737,385 | 6/1973 | Werdehausen | 252/102 |
| 3,799,893 | 3/1974 | Quinlan | 260/2 |
| 4,036,882 | 7/1977 | Bertozzi et al. | 260/584 B |
| 4,075,130 | 2/1978 | Naylor et al. | 510/499 |
| 4,548,744 | 10/1985 | Connor | 252/545 |
| 4,597,898 | 7/1986 | Vander Meer | 510/325 |
| 4,676,921 | 6/1987 | VanderMeer | 252/174.23 |
| 4,689,167 | 8/1987 | Collins et al. | 510/299 |
| 4,806,259 | 2/1989 | Amjad | 252/80 |
| 4,891,160 | 1/1990 | VanderMeer | 252/545 |
| 5,387,365 | 2/1995 | Moriya et al. | 252/180 |
| 5,565,145 | 10/1996 | Watson et al. | 510/350 |

FOREIGN PATENT DOCUMENTS

| | | | |
|---|---|---|---|
| 0042187 | 12/1981 | European Pat. Off. | |
| 206513 | 12/1986 | European Pat. Off. | C11D 3/30 |
| 269169 | 1/1988 | European Pat. Off. | C11D 3/386 |
| 2 026 793 | 9/1970 | France | C11D 3/00 |
| WO 95/32272 | 11/1995 | WIPO | |

OTHER PUBLICATIONS

Angewante Markromolekulare Chemie, vol. 211, 1993, Basel CH, pp. 103–112, XP000404109 Rivas et al.: "Branched poly(ethylene imine) support for resins with retention properties for heavy metal ions" see the whole document.

Primary Examiner—Douglas J. McGinty
Assistant Examiner—Lorna M. Douyon
Attorney, Agent, or Firm—Richard S. Echler, Sr.; B. M. Bolam; K. W. Zerby

[57] ABSTRACT

Modified polyamines comprise polyalkyleneoxy or carboxylate-like or carboxylate-derived substituents or mixtures thereof, said polyamines are useful in laundry detergent compositions, presoak compositions or conditioning compositions for the control of dye fabric color loss or fading or for the prevention of graying or yellowing of white fabric. The present invention also relates to a method for preventing the fading of colored fabric or the build up yellow or gray color on white fabric.

4 Claims, No Drawings

LAUNDRY DETERGENTS COMPRISING HEAVY METAL ION CHELANTS

FIELD OF THE INVENTION

The present invention relates to modified polyamine heavy metal ion chelants that provide improved fabric color and whiteness maintenance. The present invention also relates to laundry detergent compositions comprising modified polyamines which provide through the wash fabric color protection.

BACKGROUND OF THE INVENTION

Modern fabric comprises synthetic materials (e.g., Dacron), natural fibers (e.g., cotton), as well as blends thereof, however many skilled in the laundry art consider fabric to have two embodiments: white fabric and colored fabric. The consumer has long recognized the need to delineate, between colored and white clothing. It was the common "wash-day" observation that many colored fabrics had a propensity to "bleed" into the laundry liquor and deposit onto other fabrics that led to the practice of sorting clothes into white fabric and colored fabric. In addition, because of problems with color fading, dyed fabric can not be laundered at the hotter water temperatures typical for whites. Once sorting became a standard practice within the laundry art, separate processes and materials evolved for cleaning these separated white and dyed fabric. The introduction of hypochlorite bleach into the laundry process, because it is not compatible with many fabric dyes, solidified the establishment of white and dyed material as the two major laundry categories.

Hypochlorites are among the most commonly used bleaching agents used to clean white, non-dyed fabrics. These bleaches chemically destroy the colored stains present on white fabric. It is generally regarded that for highly conjugated, fixed stains, the first treatment with bleaching agents oxidizes the stain-producing molecules to a non-colored or less colored species that is subsequently removed in the rinse cycle. For more difficult stains, further treatment with bleach is necessary, although the over usage of bleach can damage even white fabric. The goal of imparting a "bright whiteness" to white fabric has led to the development of many adjunct laundry ingredients. One such material is optical brighteners added to reduce the yellow cast that develops on white fabrics after successive washings.

Many synthetic fabrics have optical brighteners built into the fibers or fixed onto the synthetic fabric during manufacture. These additional brightening agents help to compensate in part for the yellow cast that develops when non-colored fabrics are washed in water containing heavy metal ions. However despite the use of bleaches, the incorporation of brighteners into the fabric, and other whiteness enhancing materials, some level of dinginess still persists on many white fabrics after several washings.

For colored fabrics a different set of principles exists. Although dyed and white fabrics often comprise the same natural or synthetic materials, many of the dyes used to color fabrics are susceptible to the harsh bleaching conditions used to "whiten" non-dyed fabrics. The desire to remove stains from dyed fabric has provided further impetus for the development of separate non-damaging bleaching materials for colored fabrics. However, safe stain removal is only one issue that is connected to colored fabrics. Colored materials must be guarded against fading, a condition where the original color is lost due to one or more conditions. The problems of fading, change in color intensity, or color hue are even more perceptible than the "yellowing" of whites. In fact, consumers are well aware that garments comprising different synthetic materials, but having the same color, may fade at different rates in the laundry process.

Surprisingly, the materials disclosed in the present invention provide for increased color protection for both white and colored fabrics. The dinginess and yellow cast that develops on white fabrics is reduced while the color fading and changing of color-hue of dyed fabrics are marginalized.

Without wishing to be limited by theory, the modified polyamines of the present invention are believed to serve to chelate heavy metal ions in the laundry liquor, that contribute significantly to both the yellowing of white fabrics and the fading or change of hue of colored materials. It has now been discovered that what appears to be a "washing out" of dye molecules during the wash cycle is actually in some cases a dye molecule modification process. Heavy metal ions, such as copper, chelate with dye molecules creating a perturbation and change in the absorption spectrum of these molecules. Although by this process no dye molecules are lost, the result of this chelation is a change of hue or a dimming or loss of intensity to the color of the fabric. Preventing the association of these heavy metal ions to the fabric dye molecules results in a reduction of fabric hue changing or color fading.

Conventional chelants have long been used to modify the effects of heavy metal ions in the laundry wash liquor, however these conventional chelants are removed with the bulk of the other detergent components as the laundry liquor is drained away prior to the rinse cycle. Hence, any protection afforded by these standard laundry chelants is largely lost when the wash liquor is replaced by the new rinse water which may now contain a fresh supply of heavy metals. The heavy metal chelants of the present invention are highly substantive and during the wash cycle are deposited onto fabrics from the laundry liquor. They are then slowly released during subsequent exposures to laundry cycles, for example, the following rinse cycle. For this reason they are present in all the cycles during the laundering process to protect against the effects of heavy metal ions. In fact, the substantivity of the compounds of the present invention provides protection to white and colored fabrics for several washes after treatment with these materials has been suspended. Other types of chelants that may be used in the wash that do not have this substantive effect are much less effective against the loss and fading of fabric color quality.

The surprisingly effective compounds of the present invention are modified polyamines, especially polyalkyleneimines, that have less than 100% of their nitrogen moieties modified, that is about 0.5% to 90% of their nitrogen moieties modified. The modifying groups are polyalkoxylates such as ethoxylates or carboxylate-related moieties.

The compounds of the present invention that are modified by attachment of polyalkoxylate moieties to the polyamines are in general highly effective against the heavy metal ions responsible for color fidelity problems (e.g., copper), while the polyamines of the present invention modified for use by attachment of carboxylate moieties are superior in their protection against ions (e.g., manganese) that effect the dinginess of white fabrics and in addition are still highly effective against heavy metals responsible for color fidelity problems.

BACKGROUND ART

Various references relate to polyalkyleneimines and to substituted polyalkyleneimines, see for example; U.S. Pat.

No. 3,686,128, Werdehausen et al., issued Aug. 22, 1972; U.S. Pat. No. 3,737,385, Werdehausen, issued Jun. 5, 1973; U.S. Pat. No. 4,548,744, Connor, issued Oct. 22, 1985; U.S. Pat. No. 4,597,898, Vander Meer, issued Jul. 1, 1986; U.S. Pat. No. 4,676,921, issued Jun. 30, 1987; U.S. Pat. No. 4,891,160, issued Jan. 2, 1990; WO 95/32272, published Nov. 30, 1995; EP 269,169, Barrat et al., published Jun. 1, 1988; and EP 206,513, Walker, published Dec. 30, 1986.

SUMMARY OF THE INVENTION

The present invention relates to water soluble or dispersible heavy metal ion control agents comprising:

i) a modified polyamine having a backbone of the formula

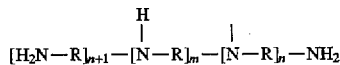

wherein R is $C_2$-$C_{22}$ alkylene, $C_3$-$C_{22}$ alkyl substituted alkylene, $-CH_2CH(OH)CH_2-$, $-(R^1O)_xR^1-$, $-CH_2CH(OH)CH_2O(R^1O)_x-CH_2CH(OH)CH_2-$, and mixtures thereof, and ii) from 0.5% to 90% of the polyamine backbone —NH and —OH units are substituted by units independently selected from:

a) units having the formula

wherein $R^1$ is $C_2$-$C_6$ alkylene, $C_3$-$C_6$ alkyl substituted alkylene, and mixtures thereof; $R^2$ is hydrogen, $C_1$-$C_{22}$ alkyl, and mixtures thereof;

b) units having the formula

wherein each $R^3$, $R^4$, and $R^5$ is independently selected from the group consisting of hydrogen, $-(CH_2)_y(L)_zR^6$, and mixtures thereof provided that one $R^3$, $R^4$, or $R^5$ is not a hydrogen atom, wherein $R^6$ is $-CO_2H$, $-C(NH)NH_2$, $-CH(CO_2H)CH_2CO_2H$, $-C(SH)S$, $-C(O)NHOH$, $-C(NOH)NH_2$, $-CH_2P(O)(OH)_2$, $-OP(O)(OH)_2$, and mixtures thereof; L is —NH—, —S—, and mixtures thereof;

c) units having the formula $-C(O)CH_2N(CH_2CO_2H)_2$, $-C(O)CH_2N(CH_2CO_2H)CH_2CH_2N(CH_2CO_2H)_2$, $-(CH_2)_pCH(CO_2H)N(CH_2CO_2H)_2$, and mixtures thereof;

provided that when greater than about 30% of the —NH units are substituted by a unit having the formula —CH(CO_2H)CH_2CO_2H or —CH(CO_2H)CH_2CO_2H, at least one other unit from group (a) or group (c) is also selected; m is from 2 to about 700, n is from 0 to about 350, p is from 1 to 20, w is 0 or 1, x is from 1 to 100, y is from 0 to 3, z is 0 or 1.

It is also the purpose of the present invention to provide a method for fabric color protection, that is preventing colored fabric from fading and white fabric from developing dinginess using an aqueous solution containing at least 10 ppm of the modified polyamines described herein.

It is a purpose of the present invention to provide detergent compositions comprising heavy metal ion control agents that are substantive to fabric and are active in both the wash and rinse cycle laundry liquors.

It is a further purpose of the present invention to provide laundry detergent compositions comprising:

a) at least 0.1% by weight, of a detersive surfactant;
b) at least 0.001% by weight, of a heavy metal ion control agent according to the present invention; and
c) the balance carriers and adjunct ingredients.

It is a further purpose of the present invention to provide a fabric pre-soak or conditioning composition providing color protection to fabrics.

It is still a further purpose of the present invention to provide laundry detergent compositions having a heavy metal ion control agent that provides for increased fabric whiteness.

It is also a further purpose of the present invention to provide heavy metal ion control agents that can be added via a rinse cycle additive, such as part of a fabric softer composition, or added via the dryer.

It is a yet further purpose of the present invention to provide laundry detergent compositions that deliver fabric color protection and increased fabric whiteness on a through the wash basis.

All percentages, ratios and proportions herein are by weight, unless otherwise specified. All temperatures are in degrees Celsius (°C.) unless otherwise specified. All documents cited are, in relevant part, incorporated herein by reference.

DETAILED DESCRIPTION OF THE INVENTION

The present invention relates to laundry detergent and pre-soak and conditioning compositions comprising water soluble or dispersible heavy metal ion control agents comprising:

i) a modified polyamine having a backbone of the formula

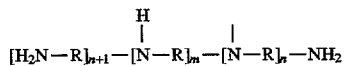

wherein R is $C_2$-$C_{22}$ alkylene, $C_3$-$C_{22}$ alkyl substituted alkylene, $-CH_2CH(OH)CH_2-$, $-(R^1O)_xR^1-$, $-CH_2CH(OH)CH_2O(R^1O)_x-CH_2CH(OH)CH_2-$, and mixtures thereof; and ii) from 0.5% to 90% of the polyamine backbone —NH units are substituted by units independently selected from:

a) units having the formula

wherein $R^1$ is $C_2$-$C_6$ alkylene, $C_3$-$C_6$ alkyl substituted alkylene, and mixtures thereof, $R^2$ is hydrogen, $C_1$-$C_{22}$ alkyl, and mixtures thereof;

b) units having the formula

wherein each $R^3$, $R^4$, and $R^5$ is independently selected from the group consisting of hydrogen, $-(CH_2)_y(L)_zR^6$, and mixtures thereof provided that one $R^3$, $R^4$, or $R^5$ is not a hydrogen atom, wherein $R^6$ is $-CO_2H$, $-C(NH)NH_2$, $-CH(CO_2H)CH_2CO_2H$, $-C(SH)S$, $-C(O)NHOH$, $-C(NOH)NH_2$, $-CH_2P(O)(OH)_2$, $-OP(O)(OH)_2$, and mixtures thereof; L is —NH—, —S—, and mixtures thereof;

c) units having the formula $-C(O)CH_2N(CH_2CO_2H)_2$, $-C(O)CH_2N(CH_2CO_2H)CH_2CH_2N(CH_2CO_2H)_2$, $-(CH_2)_pCH(CO_2H)N(CH_2CO_2H)_2$, and mixtures thereof;

m is from 2 to about 700, n is from 0 to about 350, p is from 1 to 20, w is 0 or 1, x is from 1 to 100, y is from 0 to 3, z is 0 or 1 as well as a method for protecting dyed or colored fabric from fading and white fabric from developing dinginess.

The heavy metal ion control agents of the present invention comprise a modified polyamine backbone of the formula

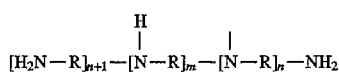

wherein the value of m is from 2 to about 700 and the value of n is from 0 to about 350. Preferably the compounds of the present invention comprise polyamines having a ratio of m:n that is at least 1:1 but may include linear polymers (n equal to 0) as well as a range as high as 10:1, preferably the ratio is 2:1. When the ratio of m:n is 2:1, the ratio of primary-:secondary:tertary amine moieties, that is the ratio of —$RNH_2$, —RNH, and —RN moieties, is 1:2:1.

R units are $C_2$-$C_6$ alkylene, $C_3$-$C_{22}$ alkyl substituted alkylene, —$CH_2$—CH(OH)$CH_2$—, —($R^1$ O)$_x$$R^1$—, —$CH_2$CH(OH)$CH_2$O($R^1$O)$_x$$CH_2$CH(OH)$CH_2$—, and mixtures thereof, preferably ethylene, 1,2-propylene, 1,3-propylene, and mixtures thereof, more preferably ethylene. R units serve to connect the amine nitrogens of the backbone.

The preferred heavy metal chelating agents of the present invention comprise polyamine backbones wherein less than 50% of the R groups comprise more than 3 carbon atoms. The use of two and three carbon spacers as R moieties between nitrogen atoms in the backbone is advantageous for controlling the chelation properties of the molecules, whereas inclusion of longer chain length spacers, and spacers other than alkylene moieties, are advantageous for controlling properties such as substantivity and molecular weight. For example, ethylene, 1,2-propylene, and 1,3-propylene comprise 3 or less carbon atoms and the preferred embodiments of the present invention can comprise any amount of these three moieties in excess of 50%. For the preferred embodiments of the present invention moieties such as —($R^1$O)$_x$$R^1$—, and —$CH_2$CH(OH)$CH_2$O($R^1$O)$_x$$R^1$$CH_2$CH(OH)$CH_2$— cannot comprise 50% or more of the R moieties present in the polymer backbone. More preferred embodiments of the present invention comprise less than 25% moieties having more than 3 carbon atoms. Most preferred backbones comprise less than 10% moieties having more than 3 carbon atoms.

The heavy metal chelants of the present invention comprise homogeneous or non-homogeneous polyamine backbones. For the purpose of the present invention the term "homogeneous polyamine backbone" is defined as a polyamine backbone having R units that are the same (i.e., all ethylene). However, this sameness definition does not exclude polyamines that comprise other extraneous units comprising the polymer backbone and that are present due to an artifact of the chosen method of chemical synthesis. For example, it is known to those skilled in the art that ethanolamine may be used as an "initiator" in the synthesis of polyethyleneimines, therefore a sample of polyethyleneimine that comprises one hydroxyethyl moiety resulting from the polymerization "initiator" would be considered to comprise a homogeneous polyamine backbone for the purposes of the present invention.

For the purposes of the present invention the term "non-homogeneous polymer backbone" refers to polyamine backbones that are a composite of shorter chained polyamines that are coupled with suitable "chain elongation moieties". The proper manipulation of these "chain elongation moieties" provides the formulator with the ability to change the solubility and substantivity of the heavy metal ion control agents of the present invention. Examples of these "chain elongation moieties" are $C_4$-$C_{22}$ alkyl substituted alkylene, —$CH_2$—CH(OH)$CH_2$—, —($R^1$O) $_x$$R^1$—, $CH_2$CH(OH)$CH_2$O($R^1$O)$_x$$CH_2$CH(OH)$CH_2$—, preferably —$CH_2$—CH(OH)$CH_2$—, —($R^1$O)$_x$$R^1$—, —$CH_2$CH(OH)$CH_2$O($R^1$O)$_x$$CH_2$CH(OH)$CH_2$—, however this list is not meant to be totally inclusive of those moieties suitable for use in the present invention.

An example of a polyamine backbone comprising a "chain elongation moiety" suitable for use as a more preferred embodiment (less than 25% of the R backbone moieties having more than 3 carbon atoms) of the present invention has the formula

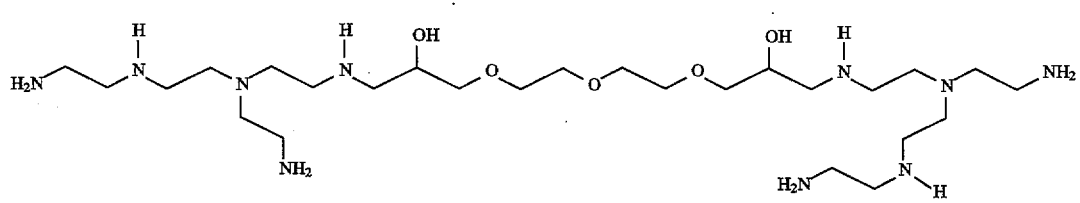

wherein 8 R units comprise ethylene units and 1 R unit comprises a

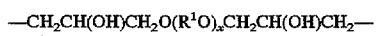

moiety wherein $R^1$ is ethylene and x is equal to 2.

An example of a polyamine backbone comprising a "chain elongation moiety" suitable for use as a most preferred embodiment (less than 10% of the R backbone moieties having more than 3 carbon atoms) of the present invention has the formula

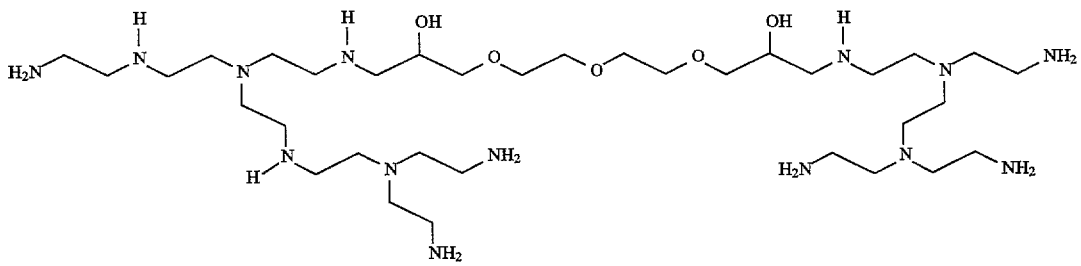

wherein 12 R units comprise ethylene units and 1 R unit comprises a

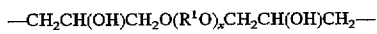

moiety wherein $R^1$ is ethylene and x is equal to 1.

The above two examples of suitable polyamine backbones comprising a "chain elongation moiety" are examples of low molecular weight polyamines connected by a unit having greater than three carbon atoms. This provides the formulator with a great deal of synthetic flexibility when producing materials that are effective heavy metal chelants suitable for use as colored and white fabric protectants.

However, not all of the preferred heavy metal ion controlling agents of the present invention comprise backbones that include a "chain elongation moiety". The preferred polyamines that comprise the backbone of the compounds of the present invention are generally polyalkyleneamines (PAA's), polyalkyleneimines (PAI's), preferably polyethyleneamine (PEA's), polyethyleneimines (PEI's), or PEA's or PEI's connected by moieties having longer R units than the parent PAA's, PAI's, PEA's or PEI's. A common polyalkyleneamine (PAA) is tetrabutylenepentamine. PEA's are obtained by reactions involving ammonia and ethylene dichloride, followed by fractional distillation. The common PEA's obtained are triethylenetetramine (TETA) and teraethylenepentamine (TEPA). Above the pentamines, i.e., the hexamines, heptamines, octamines and possibly nonamines, the cogenerically derived mixture does not appear to separate by distillation and can include other materials such as cyclic amines and particularly piperazines. There can also be present cyclic amines with side chains in which nitrogen atoms appear. See U.S. Pat. No. 2,792,372, Dickinson, issued May 14, 1957, which describes the preparation of PEA's.

The PEI's which comprise the preferred backbones of the polyamines of the present invention can be prepared, for example, by polymerizing ethyleneimine in the presence of a catalyst such as carbon dioxide, sodium bisulfite, sulfuric acid, hydrogen peroxide, hydrochloric acid, acetic acid, etc. Specific methods for preparing PEI's are disclosed in U.S. Pat. No. 2,182,306, Ulrich et al., issued Dec. 5, 1939; U.S. Pat. No. 3,033,746, Mayle et al., issued May 8, 1962; U.S. Pat. No. 2,208,095, Esselmann et al., issued Jul. 16, 1940; U.S. Pat. No. 2,806,839, Crowther, issued Sep. 17, 1957; and U.S. Pat. No. 2,553,696, Wilson, issued May 21, 1951 (all herein incorporated by reference). In addition to the linear and branched PEI's, the present invention also includes the cyclic amines that are typically formed as artifacts of synthesis. The presense of these materials may be increased or decreased depending on the conditions chosen by the formulator.

The polyamines of the present invention may develop undesirable off-colors due to impurities present as artifacts of their preparation or produced during processing or handling of the polyamines. In the case where the presence of color is unacceptable in the final formulation, the processor or formulator may apply one or more known procedures for "de-colorizing" the polyamines of the present invention. This de-colorizing may be accomplished at any stage in the processing of the polyamines disclosed herein, provided said processing does not limit or diminish the effectiveness of the final heavy metal ion control agents.

Treatment with activated charcoal in the presence of a suitable solvent is a common procedure for de-colorizing organic materials and may be applied to the polyamines of the present invention. Contact with silicates or diatomaceous earth are additional de-colorizing measures. Treatment with bleaching agents (e.g., hypohalites or peracids) also serves as a suitable method for de-colorizing the chelants of the present invention provided that once de-colorizing with a bleaching agent is accomplished, the formulator insures that little or no active bleaching agent is carried throught to the formulation, as described in detail hereinafter.

When bleaching agents are used to de-colorize the initial polyamines or the final heavy metal chelants, caution must be taken to insure that excess bleach is not present. The polyamines disclosed in the present invention act as chlorine scavengers when hypochlorite is present and this interaction with chlorine diminishes the effectiveness of the heavy metal chelants by rendering one or more chelating sites inactive. In a like manner, "oxygen" bleaches, such as peracid bleaches, react with the polyamine backbone nitrogens of the present invention and oxidize said nitrogens to N-oxides. This also has the effect of diminishing the effectiveness of the heavy metal chelants described herein. Therefore it is highly desirable that any bleaching agent be removed prior to final formulation of the laundry composition.

Under severe cases of discoloration, the formulator may add an additional amount of polyamine to compensate for that amount lost by the bleaching agent treatment.

The total concentration or amount of chlorine-based oxidants is often expressed as "available chlorine" or less frequently as "active chlorine". Available chlorine is the equivalent concentration of the amount of $Cl_2$ needed to form one mole of hypochlorite. Active chlorine is the equivalent concentration or amount of Cl atoms that can accept two electrons. Because $Cl_2$ only accepts two electrons as does HOCl, it only has one active Cl atom by definition. Thus the active chlorine is one-half of the available chlorine.

Procedure for Determining the Presence of Available Chlorine (from NaOCl)

A 100 mL Erlenmeyer flask equipped with a magnetic stirring bar is tare to the last significant decimal place. The sample to be analyzed is charged to the flask and weighed. 50 mL's of distilled and de-ionized water is added to the sample. Slowly and with sufficient stirring, 10 mL's of glacial acetic acid is added to the flask containing the sample. 1 mL of a 50% aqueous solution of potassium iodide is then added. The sample is then titrated with a stock solution of 0.1 N sodium thiosulfate until the solution goes from deep amber color to clear.

$$\% \text{ available chlorine} = \frac{(\#\text{mL's of 0.1 N Na}_2\text{S}_2\text{O}_3 \times 0.355)}{\text{mass of sample, gms}}$$

For the purposes of the present invention the final laundry detergent composition comprises less than 1%, preferably less than 0.1%, more preferably less than 0.05% by weight, of available chlorine.

Peroxygen bleaching compounds contain the peroxide linkage (—O—O—) in which one of the oxygen atoms is active. This activity, referred to as Active Oxygen (AO), is measured by the oxidation of iodine under acidic conditions or by a ceric sulfate titration as described in S. N. Lewis, in R. Augustine, ed., *Oxidation*, Marcel Dekker Inc., New York, 1969, pp. 213–258. Active oxygen content, usually expressed as a percent, is the atomic weight of active oxygen divided by the molecular weight of the compound.

$$\% \text{ active oxygen} = \frac{(\text{number of active oxygens} \times 16)}{\text{molecular weight of peroxygen bleach}} \times 100$$

The same procedure as outlined above is therefore suitable for use to titrate any peracid bleach sample for the % of active oxygen.

For the purposes of the present invention the final laundry detergent composition comprises less than 1%, preferably less than 0.1%, more preferably less than 0.05% by weight, of active oxygen. For the purposes of the present invention it is most preferred that the laundry detergent compositions described herein when tested either for "% available chlorine" or for "% active oxygen", give no positive response for active bleaching agent, that is all active bleaching agent is consumed prior to formulation of the final laundry detergent compositions.

The amine units of the polyamine backbone are substituted by one or more independently selected moieties further described herein below. Each nitrogen atom of the backbone having a hydrogen atom is a potential site of substitution. Primary amines, —NH$_2$, have two sites of substitution, secondary amines, —NH—, have one site of substitution, while tertiary amines, —N—, comprising the polyamine backbone have no sites of substitution. The percentage of the total —NH sites that are preferably substituted are from 0.5% to less than about 90%, more preferably from 0.5% to less than about 50%, yet more preferably from about 0.5% to less than about 45%, most preferably 0.5% to less than about 25%. The substituents may comprise moieties that are all identical or that are a mixture selected from the moieties described further herein below.

However, prior to substitution, some polyamine backbones may comprise a "chain elongation moiety", for example:

—CH$_2$CH(OH)CH$_2$O(R$^1$O)$_x$CH$_2$CH(OH)CH$_2$— wherein two free hydroxyl moieties (—OH) are available to undergo substitution under some of the same chemical conditions that are used to substitute one or all of the —NH units. When calculating the degree of backbone substitution (per cent of backbone substitution) these hydroxyl moieties will be included for calculation purposes if the substituting moieties will react with the —OH moieties as well as the —NH$_2$ and —NH moieties of the backbone. The hydroxyl groups are excluded from this calculation if the process used by the formulator restricts in some manner the reactivity of said hydroxyl moieties (such as use of an —OH protecting group or alkylation without the presence of strong base).

N—H Substituent groups: Moieties used to Modify the Polyamine Backbone

The substituent groups of the present invention comprise polyoxyalkyleneoxy moieties that are either capped or un-capped, and carboxylate-like or carboxylate-derived moieties.

Substituents according to the present invention having the formula

—(CH$_2$CH(OH)CH$_2$)$_w$(R$^1$O)$_x$R$^2$ are polyoxyalkyleneoxy moieties, wherein R$^1$ units are C$_2$–C$_6$ alkylene, C$_3$–C$_6$ substituted alkylene, preferably ethylene, 1,2-propylene, and 1,3-propylene, more preferably ethylene. R$^2$ units are hydrogen, or C$_1$–C$_{22}$ alkyl, preferably hydrogen or C$_1$–C$_4$ alkyl, more preferably hydrogen or methyl. The index w is 0 or 1; the index x is from 1 to about 100, preferably 1 to about 50, more preferably 1 to about 25, most preferably from about 3 to about 20.

Substituents according to the present invention having the formula

—CR$^3$R$^4$R$^5$ are carboxylate-derived or carboxylate-like moieties, wherein each R$^3$, R$^4$, and R$^5$ is independently selected from the group consisting of hydrogen, —(CH$_2$)$_y$(L)$_z$R$^6$, and mixtures thereof, provided that at least one R$^3$, R$^4$, or R$^5$ is not a hydrogen atom. R$^6$ units are —CO$_2$H, —C(NH)NH$_2$, —CH(CO$_2$H)CH$_2$CO$_2$H, —C(SH)S, —C(OH)NOH, —C(NOH)NH$_2$, —CH$_2$P(O)(OH)$_2$, —OP(O)(OH)$_2$, and mixtures thereof, preferably —CO$_2$H. L is —NH—, —S—, or mixtures thereof, preferred L is —NH— when R$^6$ units are —C(NH)NH$_2$ or —CH$_2$P(O)(OH)$_2$. The value of the index y is from 0 to 3, preferably 0 or 1. The value of the index z is 0 or 1. The index z is 0 when R$^6$ comprises —CO$_2$H.

Preferred —NH substituents are carboxylate-like or carboxylate-derived moieties of the formula

—CR$^3$R$^4$R$^5$ wherein at least two of the R$^3$, R$^4$, and R$^5$ units are substituted by —(CH$_2$)$_y$(L)$_z$R$^6$ having the formula

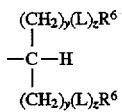

or all three of the R$^3$, R$^4$, and R$^5$ units are substituted by —(CH$_2$)$_y$(L)$_z$R$^6$ having the formula

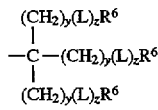

and each R$^6$ can comprise the same or different units, and each y and z can assume different values. More preferred are the moieties having the formula

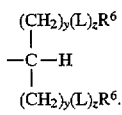

For the purposes of the present invention, when the —NH substituents are —CR³R⁴R⁵ moieties, all of the R³, R⁴, and R⁵ units cannot comprise a hydrogen atom, that is —CR³R⁴R⁵ cannot be a methyl group.

For the purposes of the present invention the term "carboxylate derived moieties or carboxylate-like moieties" are defined as those units that either contain a carboxylate moiety (e.g., —CO₂H), units that comprise an Sp² hybrid carbon atom bonded to an atom other than oxygen (e.g., —C(NH)NH₂) or units having an atom other than carbon doubly bonded to oxygen or to another more electronegative atom capable of forming a heavy metal chelate (e.g., the P=O bond of —CH₂P(O)(OH)₂).

Other suitable units for substitution onto the polyamine backbone are carboxylate containing units having the formula —C(O)CH₂N(CH₂CO₂H)₂, —C(O)CH₂N(CH₂CO₂H)CH₂CH₂N(CH₂CO₂H)₂, —(CH₂)ₚCH(CO₂H)N—(CH₂CO₂H)₂, and mixtures thereof, wherein p is from 1 to 20.

Examples or preferred substituents according to the present invention having the formula

that are derivatives of carboxylates are succinic acids, diacetic acids, triacetic acids, diproprionic acids, amidines, thioureas, guanidines, dithiocarbamates, hydroxamic acids, amidoximes, and the like, although this list is not meant to be inclusive. Examples of most preferred carboxylate derived moieties or carboxylate-like moieties of the present invention include di-carboxylic acids having the formulas

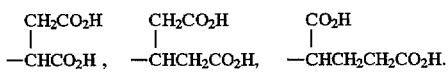

Examples of preferred carboxylate derived units or units "having an atom other than carbon doubly bonded to oxygen or to another more electronegative atom" have the formulas

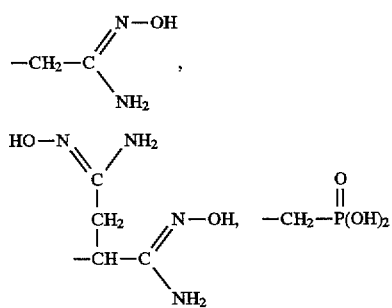

wherein combinations of the afore mention moieties or any other carboxylate or carboxylate derived moiety are suitable for use in the present invention, for example, mixed moieties having the formula

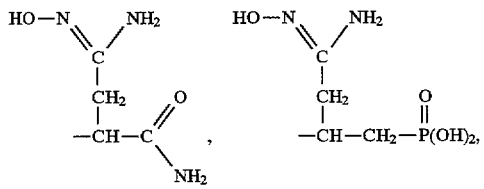

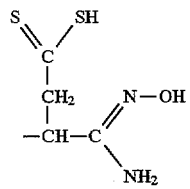

Determination of the Amount of the Total —NH Equivalents that are Substituted

In general, the polyamines of the present invention will have a ratio of primary amine: secondary amine:tertiary amine of about 1:2:1, that is the starting polyamines having the general formula

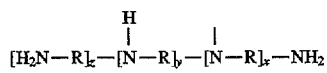

wherein R is the same as defined herein above, and generally have the indices x, y, and z represent the number of tertiary, secondary and primary amino moieties in the backbone. In general, the preferred ratio or x, y and z is the ratio of 1:2:1. The indices x, y, and z relate to the ratio of primary, secondary, and tertiary nitrogens present in the polyamine backbone and are not related to the relative ratio of moieties that comprise R units. For most cases, however, it is convenient to describe the polyamines of the present invention as having the general structure

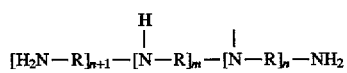

wherein preferably the value of m:n is 2:1, each R can be the same or different moiety, that is the backbone may be "homogeneous" or "non-homogeneous" as is further defined herein above.

The method for calculating "from about 0.5% to about 90% of the total polyamine backbone N—H equivalents" is defined as follows. Each hydrogen atom attached to each nitrogen atom of the backbone represents an active site for subsequent substitution (except for the case as described herein above wherein the backbone R unit comprises a substitutable —OH moiety). Therefore any —NH function capable of being substituted is considered one equivalent. Primary amine moieties, —NH₂, comprise two mole equivalents of —NH moieties and secondary amine moieties, —NH, comprise one mole equivalent of —NH moieties.

An example of the method for calculating the amount of the total polyamine backbone N—H equivalents is as follows. A heavy metal ion controlling compound according to the present invention having the structure

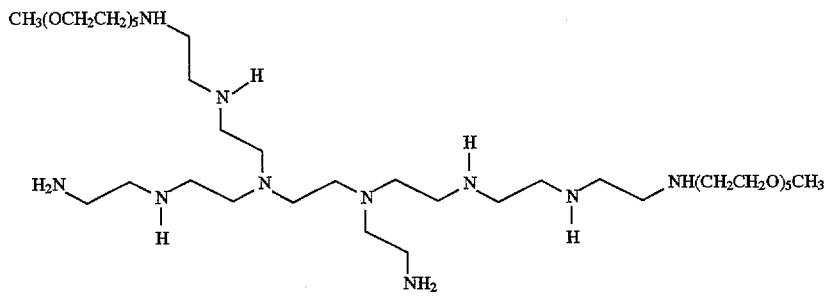

is comprised of a polyamine backbone substituted by 2 units having the structure —$(R^1O)_xR^2$ wherein $R^1$ is ethylene, $R^2$ is methyl and x is equal to 5. The number of substitutable —NH sites is determined by first considering the parent polyamine backbone having the following structure

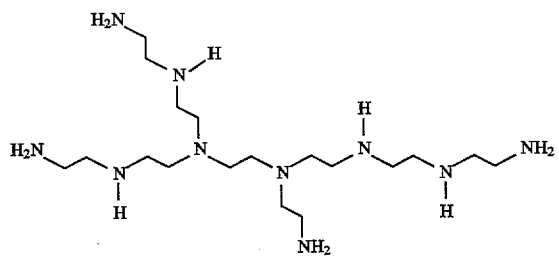

having a molecular weight of approximately 404 gm/mole (PEI 404). This "homogeneous" polyamine backbone comprises four primary amine units (4×—$NH_2$), four secondary amine units (4×—NH) and two tertiary amine units (2×—N—). The total number of backbone sites that are available for substitution is calculated as follows $$\begin{array}{r}2 \times 4 \text{ —}NH_2 = 8 \\ + 1 \times 4 \text{ —NH—} = 4 \\ \hline 12 \text{ —NH equivalents}\end{array}$$

The heavy metal control agent comprises two equivalents of polyoxyalkyleneoxy substituents, therefore dividing the number or —NH groups that are substituted by the total —NH groups available, provides the total degree of substitution:

$$\frac{2 \text{ —NH units substituted}}{12 \text{ —NH units present in backbone}} = 0.17 \times 100\% = 17\%$$

Therefore the fraction of —NH units that are substituted in the above example is approximately 17%.

In a further example, the following substituted polyethyleneimine, wherein R is ethylene, having the structure:

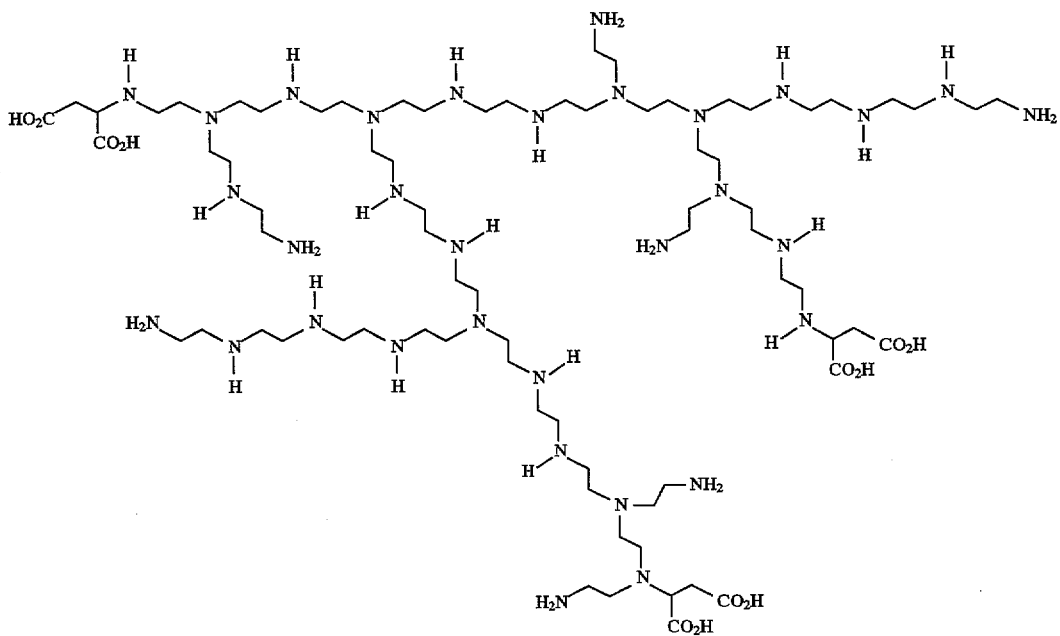

is comprised of a polyamine backbone substituted by 3 units having the structure —CH(CH$_2$CO$_2$H)CO$_2$H. The number of substitutable —NH sites is determined by first considering the parent polyamine backbone having the following structure

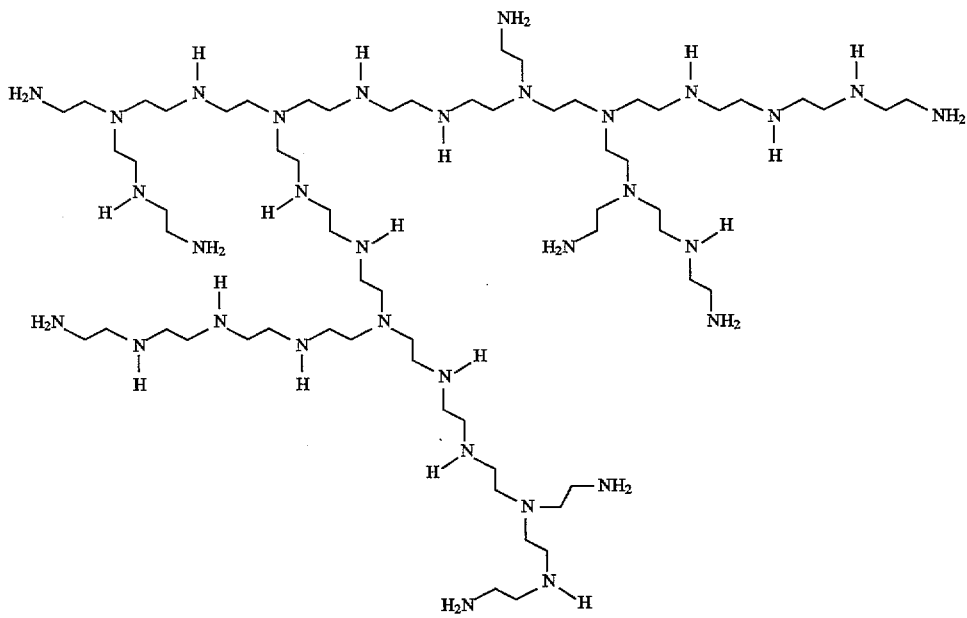

wherein the number of primary amines, —NH$_2$ units, is equal to 9 and the number of secondary amines, —NH units, is equal to 15. The total number of —NH equivalents is:

2 × 9 —NH$_2$ = 18
+ 1 × 15 —NH— = 15

33 —NH equivalents

The number of N—H substitutions in the example above is 3, therefore for this polyethyleneimine approximately 0.09 or 9% of the total N—H equivalents are substituted.

Preferred examples of the heavy metal ion chelants of the present invention comprise substituted polyamines wherein the polyamine backbones comprise polyethyleneimines (R is ethylene) and the substituent groups are partially selected from the polyoxyalkyleneoxy substituents and partially from the carboxylate-derived or carboxylate-like moieties.

The heavy metal chelating agents of the present invention may also consist of R units which comprise more than three carbon atoms. Backbones of this type may be prepared by coupling one or more substituted or un-substituted polyamines to form a longer "non-homogeneous" backbone. For example, as depicted in the scheme below, two moles of a shorter chain polyamine are reacted with four moles of a methyl capped polyethyleneglycol synthon, CH$_3$(OCH$_2$CH$_2$)$_4$Cl, to form a substituted polyamine subunit. The two shorter chain substituted polyamine subunits are then coupled to form a heavy metal chelant having a non-homogeneous backbone.

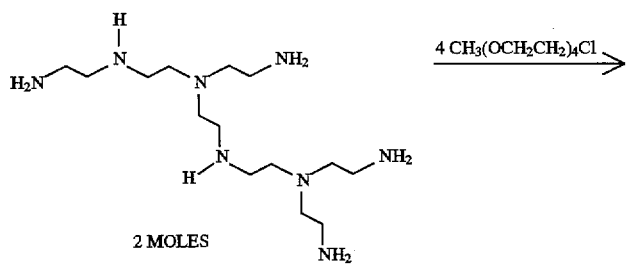

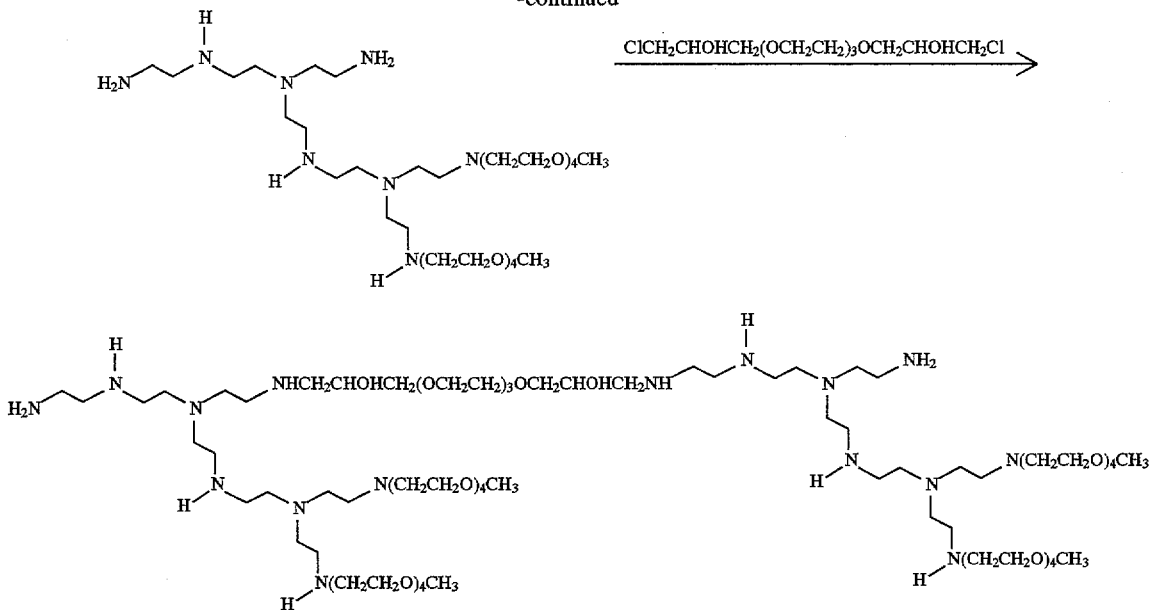

The heavy metal ion control agents of the present invention have the ability to chelate heavy metal ions responsible for the fading or change the hue of dyed fabric as well as limiting the build-up of dingy/yellowness that pervades white fabrics after successive laundering. Important to providing this chelant effect is the substantivity for fabric displayed by the compositions of the present invention. The formulator can manipulate the R units to provide an agent having a substantivity targeted to the specific usage of the composition. For example, the materials of the present invention remain on the fabric after initial application and are then gradually desorbed during successive aqueous exposures not comprising chelant. The most common of these is the rinse water immediately after the wash cycle. This rinse water often contains deleterious levels of the same heavy metal ions that were present in the original laundry liquor. Now, however, the heavy metal chelants of the present invention deposited onto the fabric stand alone to mediate the negative effects of the rinse water metal ions since any other chelants present in the original detergent composition have been largely rinsed away.

The formulator, employing the substantive nature of these compounds of the present invention can therefore formulate a laundry pre-soak composition which will protect fabrics that may be repeatedly exposed to heavy metal ions between treatments with suitable chelators. In addition, the composition of water supplies varies from geographic location to location and the formulator by varying the substituents as well as the backbone R units is able to prepare chelants according to the present invention that may be targeted to more or less harsh heavy metal ion concentrations.

The compounds of the present invention can also be added via the rinse cycle alone or as an admixture with fabric softerner or other adjunct ingredients. The compounds disclosed herein also exhibit suitable spreading properties that allow for introduction of these heavy metal chelants via the dry, for example on sheats or through other dryer additive articles.

In addition the compounds of the present invention may be useful for scavenging excess positive halogen species introduced via commercial water supply systems.

The laundry detergent and pre-soak and conditioning compositions of the present invention tupically comprise at least about 0.001% by weight of the heavy metal ion control agent, preferably from about 0.001% to about 5%, more preferably from about 0.1% to about 2%, most preferably from about 0.1% to about 1%.

The laundry detergent and pre-soak and conditioning compositions of the present invention provide the consumer with a method for protecting dyed or colored fabric from metal ion induced fading and white fabric from developing dinginess. When the heavy metal control agents according to the present invention are present in a aqueous solution of at least 0.5 ppm, preferably at least 1 ppm, more preferably from about 2 ppm to about 100 ppm, most preferably from about 2 ppm to about 50 ppm contacting fabric with this solution for a sufficient time provides protection against fading and dinginess.

For the purposes of the present invention the term "dinginess" is the development on white fabric of a gray or yellow cast that results from the interaction of heavy metal with the fabric or the body soils present. "Dinginess" can be measured by objective human grading and recorded in calibrated units, for example, in Panel Score Units (PSU) or can be measured by instrumentation known by those skilled in the art.

For the purposes of the present invention the term "contacting fabric with this solution for a sufficient time" is defined as the time necessary to impart fabric protection. This time can be as short as 10 seconds or as long as 8 to 12 hours depending on the structure of the heavy metal ion control agent, its concentration, and the degree of protection needed as well as the type of fabric to be protected.

LAUNDRY DETERGENT COMPOSITIONS

The laundry detergent compositions of the present invention in addition to the heavy metal ion control agents described herein above also comprise the following ingredients.

Surfactant—The instant cleaning compositions contain from about 0.1% to about 60% by weight of a surfactant selected from the group consisting of anionic, nonionic, ampholytic and zwitterionic surface active agents. For liquid systems, surfactant is preferably present to the extent of from about 0.1% to 30% by weight of the composition. For solid (i.e. granular) and viscous semi-solid (i.e. gelatinous, pastes, etc.) systems, surfactant is preferably present to the extent of from about 1.5% to 30% by weight of the composition.

Nonlimiting examples of surfactants useful herein typically at levels from about 1% to about 55%, by weight, include the conventional $C_{11}$–$C_{18}$ alkyl benzene sulfonates ("LAS") and primary, branched-chain and random $C_{10}$–$C_{20}$ alkyl sulfates ("AS"), the $C_{10}$–$C_{18}$ secondary (2,3) alkyl sulfates of the formula $CH_3(CH_2)_x(CHOSO_3^-M^+)$ $CH_3$ and $CH_3(CH_2)_y(CHOSO_3^-M^+)CH_2CH_3$ where x and (y+1) are integers of at least about 7, preferably at least about 9, and M is a water-solubilizing cation, especially sodium, unsaturated sulfates such as oleyl sulfate, the $C_{10}$–$C_{18}$ alkyl alkoxy sulfates ("$AE_xS$"; especially EO 1–7 ethoxy sulfates), $C_{10}$–$C_{18}$ alkyl alkoxy carboxylates (especially the EO 1–5 ethoxycarboxylates), the $C_{10}$–$C_{18}$ glycerol ethers, the $C_{10}$–$C_{18}$ alkyl polyglycosides and their corresponding sulfated polyglycosides, and $C_{12}$–$C_{18}$ alpha-sulfonated fatty acid esters. If desired, the conventional nonionic and amphoteric surfactants such as the $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxy/propoxy), $C_{12}$–$C_{18}$ betaines and sulfobetaines ("sultaines"), amine oxides, and the like, can also be included in the overall compositions. The $C_{10}$–$C_{18}$ N-alkyl polyhydroxy fatty acid amides can also be used. Typical examples include the $C_{12}$–$C_{18}$ N-methylglucamides. See WO 9,206,154. Other sugar-derived surfactants include the N-alkoxy polyhydroxy fatty acid amides, such as $C_{12}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used. If high sudsing is desired, the branched-chain $C_{10}$–$C_{16}$ soaps may be used. Mixtures of anionic and nonionic surfactants are especially useful. Other conventional useful surfactants are described further herein and are listed in standard texts.

Anionic surfactants can be broadly described as the water-soluble salts, particularly the alkali metal salts, of organic sulfuric reaction products having in their molecular structure an alkyl radical containing from about 8 to about 22 carbon atoms and a radical selected from the group consisting of sulfonic acid and sulfuric acid ester radicals. ( Included in the term alkyl is the alkyl portion of higher acyl radicals.) Important examples of the anionic synthetic detergents which can form the surfactant component of the compositions of the present invention are the sodium or potassium alkyl sulfates, especially those obtained by sulfating the higher alcohols (C8-18 carbon atoms) produced by reducing the glycerides of tallow or coconut oil; sodium or potassium alkyl benzene sulfonates, in which the alkyl group contains from about 9 to about 15 carbon atoms, (the alkyl radical can be a straight or branched aliphatic chain); sodium alkyl glyceryl ether sulfonates, especially those ethers of the higher alcohols derived from tallow and coconut oil; sodium coconut oil fatty acid monoglyceride sulfates and sulfonates; sodium or potassium salts of sulfuric acid ester of the reaction product of one mole of a higher fatty alcohol (e.g. tallow or coconut alcohols) and about 1 to about 10 moles of ethylene oxide; sodium or potassium salts of alkyl phenol ethylene oxide ether sulfates with about 1 to about 10 units of ethylene oxide per molecule and in which the alkyl radicals contain from 8 to 12 carbon atoms; the reaction products of fatty acids are derived from coconut oil sodium or potassium salts of fatty acid amides of a methyl tauride in which the fatty acids, for example, are derived from coconut oil and sodium or potassium beta-acetoxy- or beta-acetamido-alkanesulfonates where the alkane has from 8 to 22 carbon atoms.

Additionally, secondary alkyl sulfates may be used by the formulator exclusively or in conjunction with other surfactant materials and the following identifies and illustrates the differences between sulfated surfactants and otherwise conventional alkyl sulfate surfactants. Non-limiting examples of such ingredients are as follows.

Conventional primary alkyl sulfates (LAS), such as those illustrated above, have the general formula ROSO3-M+ wherein R is typically a linear C8-22 hydrocarbyl group and M is a water solublizing cation. Branched chain primary alkyl sulfate surfactants (i.e., branched-chain "PAS") having 8–20 carbon atoms are also know; see, for example, Eur. Pat. Appl. 439,316, Smith et al., filed Jan. 21, 1991.

Conventional secondary alkyl sulfate surfactants are those materials which have the sulfate moiety distributed randomly along the hydrocarbyl "backbone" of the molecule. Such materials may be depicted by the structure

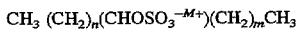

wherein m and n are integers of 2 of greater and the sum of m+n is typically about 9 to 17, and M is a water-solublizing cation.

The aforementioned secondary alkyl sulfates are those prepared by the addition of $H_2SO_4$ to olefins. A typical synthesis using alpha olefins and sulfuric acid is disclosed in U.S. Pat. No. 3,234,258, Morris, issued Feb. 8, 1966 or in U.S. Pat. No. 5,075,041, Lutz, issued Dec. 24, 1991. See also U.S. Pat. No. 5,349,101, Lutz et al., issued Sep. 20, 1994; U.S. Pat. No. 5,389,277, Prieto, issued Feb.14, 1995.

ADJUNCT INGREDIENTS

Enzymes—Enzymes can be included in the present detergent compositions for a variety of purposes, including removal of protein-based, carbohydrate-based, or triglyceride-based stains from surfaces such as textiles or dishes, for the prevention of refugee dye transfer, for example in laundering, and for fabric restoration. Suitable enzymes include proteases, amylases, lipases, cellulases, peroxidases, and mixtures thereof of any suitable origin, such as vegetable, animal, bacterial, fungal and yeast origin. Preferred selections are influenced by factors such as pH—activity and/or stability optima, thermostability, and stability to active detergents, builders and the like. In this respect bacterial or fungal enzymes are preferred, such as bacterial amylases and proteases, and fungal cellulases.

"Detersive enzyme", as used herein, means any enzyme having a cleaning, stain removing or otherwise beneficial effect in a laundry, hard surface cleaning or personal care detergent composition. Preferred detersive enzymes are hydrolases such as proteases, amylases and lipases. Preferred enzymes for laundry purposes include, but are not limited to, proteases, cellulases, lipases and peroxidases. Highly preferred for automatic dishwashing are amylases and/or proteases, including both current commercially available types and improved types which, though more and more bleach compatible though successive improvements, have a remaining degree of bleach deactivation susceptibility.

Enzymes are normally incorporated into detergent or detergent additive compositions at levels sufficient to provide a "cleaning-effective amount". The term "cleaning effective amount" refers to any amount capable of producing a cleaning, stain removal, soil removal, whitening, deodorizing, or freshness improving effect on substrates such as fabrics, dishware and the like. In practical terms for current commercial preparations, typical amounts are up to about 5 mg by weight, more typically 0.01 mg to 3 mg, of active enzyme per gram of the detergent composition. Stated otherwise, the compositions herein will typically comprise from 0.001% to 5%, preferably 0.01%–1% by weight of a commercial enzyme preparation. Protease enzymes are usually present in such commercial preparations at levels sufficient to provide from 0.005 to 0.1 Anson units (AU) of activity per gram of composition. Higher active levels may also be desirable in highly concentrated detergent formulations.

Suitable examples of proteases are the subtilisins which are obtained from particular strains of B. subtilis and B. licheniformis. One suitable protease is obtained from a strain of Bacillus, having maximum activity throughout the pH range of 8–12, developed and sold as ESPERASE® by Novo Industries A/S of Denmark, hereinafter "Novo". The preparation of this enzyme and analogous enzymes is described in GB 1,243,784 to Novo. Other suitable proteases include ALCALASE® and SAVINASE® from Novo and MAXATASE® from International Bio-Synthetics, Inc., The Netherlands; as well as Protease A as disclosed in EP 130,756 A, Jan. 9, 1985 and Protease B as disclosed in EP 303,761 A, Apr. 28, 1987 and EP 130,756 A, Jan. 9, 1985. See also a high pH protease from Bacillus sp. NCIMB 40338 described in WO 9318140 A to Novo. Enzymatic detergents comprising protease, one or more other enzymes, and a reversible protease inhibitor are described in WO 9203529 A to Novo. Other preferred proteases include those of WO 9510591 A to Procter & Gamble. When desired, a protease having decreased adsorption and increased hydrolysis is available as described in WO 9507791 to Procter & Gamble. A recombinant trypsin-like protease for detergents suitable herein is described in WO 9425583 to Novo.

In more detail, an especially preferred protease, referred to as "Protease D" is a carbonyl hydrolase variant having an amino acid sequence not found in nature, which is derived from a precursor carbonyl hydrolase by substituting a different amino acid for a plurality of amino acid residues at a position in said carbonyl hydrolase equivalent to position +76, preferably also in combination with one or more amino acid residue positions equivalent to those selected from the group consisting of +99, +101, +103, +104, +107, +123, +27, +105, +109, +126, +128, +135, +156, +166, +195, +197, +204, +206, +210, +216, +217, +218, +222, +260, +265, and/or +274 according to the numbering of Bacillus amyloliquefaciens subtilisin, as described in the patent applications of A. Baeck, et al, entitled "Protease-Containing Cleaning Compositions" having U.S. Ser. No. 08/322,676, and C. Ghosh, et al, "Bleaching Compositions Comprising Protease Enzymes" having U.S. Ser. No. 08/322,677, both filed Oct. 13, 1994.

Amylases suitable herein, especially for, but not limited to automatic dishwashing purposes, include, for example, α-amylases described in GB 1,296,839 to Novo; RAPIDASE®, International Bio-Synthetics, Inc. and TERMAMYL®, Novo. FUNGAMYL® from Novo is especially useful. Engineering of enzymes for improved stability, e.g., oxidative stability, is known. See, for example J. Biological Chem., Vol. 260, No. 11, Jun. 1985, pp 6518–6521. These preferred amylases herein share the characteristic of being "stability-enhanced" amylases, characterized, at a minimum, by a measurable improvement in one or more of: oxidative stability, e.g., to hydrogen peroxide/tetraacetylethylenediamine in buffered solution at pH 9–10; thermal stability, e.g., at common wash temperatures such as about 60° C.; or alkaline stability, e.g., at a pH from about 8 to about 11, measured versus the above-identified reference-point amylase. Stability can be measured using any of the art-disclosed technical tests. See, for example, references disclosed in WO 9402597. Stability-enhanced amylases can be obtained from Novo or from Genencor International. One class of highly preferred amylases herein have the commonality of being derived using site-directed mutagenesis from one or more of the Baccillus amylases, especially the Bacillus α-amylases, regardless of whether one, two or multiple amylase strains are the immediate precursors. Oxidative stability-enhanced amylases vs. the above-identified reference amylase are preferred for use, especially in bleaching, more preferably oxygen bleaching, as distinct from chlorine bleaching, detergent compositions herein. Such preferred amylases include (a) an amylase according to the hereinbefore incorporated WO 9402597, Novo, Feb. 3, 1994, as further illustrated by a mutant in which substitution is made, using alanine or threonine, preferably threonine, of the methionine residue located in position 197 of the B. licheniformis alpha-amylase, known as TERMAMYL®, or the homologous position variation of a similar parent amylase, such as B. amyloliquefaciens , B.subtilis, or B.stearothermophilus; (b) stability-enhanced amylases as described by Genencor International in a paper entitled "Oxidatively Resistant alpha-Amylases" presented at the 207th American Chemical Society National Meeting, Mar. 13–17 1994, by C. Mitchinson. Methionine (Met) was identified as the most likely residue to be modified. Met was substituted, one at a time, in positions 8, 15, 197, 256, 304, 366 and 438 leading to specific mutants, particularly important being M197L and M197T with the M197T variant being the most stable expressed variant. Other particularly preferred oxidative stability enhanced amylase include those described in WO 9418314 to Genencor International and WO 9402597 to Novo. Any other oxidative stability-enhanced amylase can be used, for example as derived by site-directed mutagenesis from known chimeric, hybrid or simple mutant parent forms of available amylases. Other preferred enzyme modifications are accessible. See WO 9509909 A to Novo.

Cellulases usable herein include both bacterial and fungal types, preferably having a pH optimum between 5 and 9.5. U.S. Pat. No. 4,435,307, Barbesgoard et al, Mar. 6, 1984, discloses suitable fungal cellulases from Humicola insolens or Humicola strain DSM1800 or a cellulase 212-producing fungus belonging to the genus Aeromonas, and cellulase extracted from the hepatopancreas of a marine mollusk, Dolabella Auricula Solander. Suitable cellulases are also disclosed in GB-A-2.075.028; GB-A-2.095.275 and DE-OS-2.247.832. CAREZYME® (Novo) is especially useful. See also WO 9117243 to Novo.

Suitable lipase enzymes for detergent usage include those produced by microorganisms of the Pseudomonas group, such as Pseudomonas stutzeri ATCC 19.154, as disclosed in GB 1,372,034. See also lipases in Japanese Patent Application 53,20487, laid open Feb. 24, 1978. This lipase is available from Amano Pharmaceutical Co. Ltd., Nagoya, Japan, under the trade name Lipase P "Amano," or "Amano-P." Other suitable commercial lipases include Amano-CES, lipases ex Chromobacter viscosum, e.g. Chromobacter viscosum var. lipolyticum NRRLB 3673 from Toyo Jozo Co., Tagata, Japan; Chromobacter viscosum lipases from U.S. Biochemical Corp., U.S.A. and Disoynth Co., The Netherlands, and lipases ex Pseudomonas gladioli. LIPO- LASE® enzyme derived from *Humicola lanuginosa* and commercially available from Novo, see also EP 341,947, is a preferred lipase for use herein. Lipase and amylase variants stabilized against peroxidase enzymes are described in WO 9414951 A to Novo. See also WO 9205249 and RD 94359044.

Cutinase enzymes suitable for use herein are described in WO 8809367 A to Genencor.

Peroxidase enzymes may be used in combination with oxygen sources, e.g., percarbonate, perborate, hydrogen peroxide, etc., for "solution bleaching" or prevention of transfer of dyes or pigments removed from substrates during the wash to other substrates present in the wash solution. Known peroxidases include horseradish peroxidase, ligninase, and haloperoxidases such as chloro- or bromo-peroxidase. Peroxidase-containing detergent compositions are disclosed in WO 89099813 A, Oct. 19, 1989 to Novo and WO 8909813 A to Novo.

A range of enzyme materials and means for their incorporation into synthetic detergent compositions is also disclosed in WO 9307263 A and WO 9307260 A to Genencor International, WO 8908694 A to Novo, and U.S. Pat. No. 3,553,139, Jan. 5, 1971 to McCarty et al. Enzymes are further disclosed in U.S. Pat. No. 4,101,457, Place et al, Jul. 18, 1978, and in U.S. Pat. No. 4,507,219, Hughes, Mar. 26, 1985. Enzyme materials useful for liquid detergent formulations, and their incorporation into such formulations, are disclosed in U.S. Pat. No. 4,261,868, Hora et al, Apr. 14, 1981. Enzymes for use in detergents can be stabilized by various techniques. Enzyme stabilization techniques are disclosed and exemplified in U.S. Pat. No. 3,600,319, Aug. 17, 1971, Gedge et al, EP 199,405 and EP 200,586, Oct. 29, 1986, Venegas. Enzyme stabilization systems are also described, for example, in U.S. Pat. No. 3,519,570. A useful Bacillus, sp. AC13 giving proteases, xylanases and cellulases, is described in WO 9401532 A to Novo.

Enzyme Stabilizing System—Enzyme-containing, including but not limited to, liquid compositions, herein may comprise from about 0.001% to about 10%, preferably from about 0.005% to about 8%, most preferably from about 0.01% to about 6%, by weight of an enzyme stabilizing system. The enzyme stabilizing system can be any stabilizing system which is compatible with the detersive enzyme. Such a system may be inherently provided by other formulation actives, or be added separately, e.g., by the formulator or by a manufacturer of detergent-ready enzymes. Such stabilizing systems can, for example, comprise calcium ion, boric acid, propylene glycol, short chain carboxylic acids, boronic acids, and mixtures thereof, and are designed to address different stabilization problems depending on the type and physical form of the detergent composition.

One stabilizing approach is the use of water-soluble sources of calcium and/or magnesium ions in the finished compositions which provide such ions to the enzymes. Calcium ions are generally more effective than magnesium ions and are preferred herein if only one type of cation is being used. Typical detergent compositions, especially liquids, will comprise from about 1 to about 30, preferably from about 2 to about 20, more preferably from about 8 to about 12 millimoles of calcium ion per liter of finished detergent composition, though variation is possible depending on factors including the multiplicity, type and levels of enzymes incorporated. Preferably water-soluble calcium or magnesium salts are employed, including for example calcium chloride, calcium hydroxide, calcium formate, calcium malate, calcium maleate, calcium hydroxide and calcium acetate; more generally, calcium sulfate or magnesium salts corresponding to the exemplified calcium salts may be used. Further increased levels of Calcium and/or Magnesium may of course be useful, for example for promoting the grease-cutting action of certain types of surfactant.

Another stabilizing approach is by use of borate species. See Severson, U.S. Pat. No. 4,537,706. Borate stabilizers, when used, may be at levels of up to 10% or more of the composition though more typically, levels of up to about 3% by weight of boric acid or other borate compounds such as borax or orthoborate are suitable for liquid detergent use. Substituted boric acids such as phenylboronic acid, butane-boronic acid, p-bromophenylboronic acid or the like can be used in place of boric acid and reduced levels of total boron in detergent compositions may be possible though the use of such substituted boron derivatives.

Stabilizing systems of certain cleaning compositions may further comprise from 0 to about 10%, preferably from about 0.01% to about 6% by weight, of chlorine bleach scavengers, added to prevent chlorine bleach species present in many water supplies from attacking and inactivating the enzymes, especially under alkaline conditions. While chlorine levels in water may be small, typically in the range from about 0.5 ppm to about 1.75 ppm, the available chlorine in the total volume of water that comes in contact with the enzyme, for example during dish- or fabric-washing, can be relatively large; accordingly, enzyme stability to chlorine in-use is sometimes problematic. Since perborate or percarbonate, which have the ability to react with chlorine bleach, may present in certain of the instant compositions in amounts accounted for separately from the stabilizing system, the use of additional stabilizers against chlorine, may, most generally, not be essential, though improved results may be obtainable from their use. Suitable chlorine scavenger anions are widely known and readily available, and, if used, can be salts containing ammonium cations with sulfite, bisulfite, thiosulfite, thiosulfate, iodide, etc. Antioxidants such as carbamate, ascorbate, etc., organic amines such as ethylenediaminetetracetic acid (EDTA) or alkali metal salt thereof, monoethanolamine (MEA), and mixtures thereof can likewise be used. Likewise, special enzyme inhibition systems can be incorporated such that different enzymes have maximum compatibility. Other conventional scavengers such as bisulfate, nitrate, chloride, sources of hydrogen peroxide such as sodium perborate tetrahydrate, sodium perborate monohydrate and sodium percarbonate, as well as phosphate, condensed phosphate, acetate, benzoate, citrate, formate, lactate, malate, tartrate, salicylate, etc., and mixtures thereof can be used if desired. In general, since the chlorine scavenger function can be performed by ingredients separately listed under better recognized functions, (e.g., hydrogen peroxide sources), there is no absolute requirement to add a separate chlorine scavenger unless a compound performing that function to the desired extent is absent from an enzyme-containing embodiment of the invention; even then, the scavenger is added only for optimum results. Moreover, the formulator will exercise a chemist's normal skill in avoiding the use of any enzyme scavenger or stabilizer which is majorly incompatible, as formulated, with other reactive ingredients, if used. In relation to the use of ammonium salts, such salts can be simply admixed with the detergent composition but are prone to adsorb water and/or liberate ammonia during storage. Accordingly, such materials, if present, are desirably protected in a particle such as that described in U.S. Pat. No. 4,652,392, Baginski et al.

Bleaching Compounds—Bleaching Agents and Bleach Activators—The detergent compositions herein may optionally contain bleaching agents or bleaching compositions containing a bleaching agent and one or more bleach activators. These bleaching agents are not hypohalites, perborates, peracids, hydrogen peroxide, etc., which are described herein as oxidative-type bleaching agents. Thus the present invention compositions and methods are substantially free of oxidative-type bleaching agents. By "substantially free of oxidative type bleaching agents", as used herein, is meant that the present invention compositions comprise less than about 1% by weight of available oxygen (AO) or available chlorine from bleaching agents, preferably less than about 0.1% of available oxygen (AO) or available chlorine from bleaching agents, more preferably 0.05% by weight of available oxygen (AO) or available chlorine from bleaching agents, most preferably no available oxygen (AO) or available chlorine from bleaching agents.

The present invention compositions and methods may comprise, however, reducing bleaches or photochemical bleaches. When present, such bleaching agents will typically be at levels of from about 0.025% to about 30%, more typically from about 5% to about 20%, of the detergent composition, especially for fabric laundering.

Bleaching agents other than chlorine and peroxygen bleaching agents are also known in the art and can be utilized herein. One type of non-peroxygen bleaching agent of particular interest includes photoactivated bleaching agents such as the sulfonated zinc and/or aluminum phthalocyanines. See U.S. Pat. No. 4,033,718, issued Jul. 5, 1977 to Holcombe et al. If used, detergent compositions will typically contain from about 0.025% to about 1.25%, by weight, of such bleaches, especially sulfonate zinc phthalocyanine. Reducing bleaching systems are also useful such as sulfites or dithionites.

Builders—Detergent builders can optionally be included in the compositions herein to assist in controlling mineral hardness. Inorganic as well as organic builders can be used. Builders are typically used in fabric laundering compositions to assist in the removal of particulate soils.

The level of builder can vary widely depending upon the end use of the composition and its desired physical form. When present, the compositions will typically comprise at least about 1% builder. Liquid formulations typically comprise from about 5% to about 50%, more typically about 5% to about 30%, by weight, of detergent builder. Granular formulations typically comprise from about 10% to about 80%, more typically from about 15% to about 50% by weight, of the detergent builder. Lower or higher levels of builder, however, are not meant to be excluded.

Inorganic or P-containing detergent builders include, but are not limited to, the alkali metal, ammonium and alkanolammonium salts of polyphosphates (exemplified by the tripolyphosphates, pyrophosphates, and glassy polymeric meta-phosphates), phosphonates, phytic acid, silicates, carbonates (including bicarbonates and sesquicarbonates), sulphates, and aluminosilicates. However, non-phosphate builders are required in some locales. Importantly, the compositions herein function surprisingly well even in the presence of the so-called "weak" builders (as compared with phosphates) such as citrate, or in the so-called "underbuilt" situation that may occur with zeolite or layered silicate builders.

Examples of silicate builders are the alkali metal silicates, particularly those having a $SiO_2:Na_2O$ ratio in the range 1.6:1 to 3.2:1 and layered silicates, such as the layered sodium silicates described in U.S. Pat. No. 4,664,839, issued May 12, 1987 to H. P. Rieck. NaSKS-6 is the trademark for a crystalline layered silicate marketed by Hoechst (commonly abbreviated herein as "SKS-6"). Unlike zeolite builders, the NaSKS-6 silicate builder does not contain aluminum. NaSKS-6 has the delta-$Na_2SiO_5$ morphology form of layered silicate. It can be prepared by methods such as those described in German DE-A-3,417,649 and DE-A-3,742,043. SKS-6 is a highly preferred layered silicate for use herein, but other such layered silicates, such as those having the general formula $NaMSi_xO_{2x+1} \cdot yH_2O$ wherein M is sodium or hydrogen, x is a number from 1.9 to 4, preferably 2, and y is a number from 0 to 20, preferably 0 can be used herein. Various other layered silicates from Hoechst include NaSKS-5, NaSKS-7 and NaSKS-11, as the alpha, beta and gamma forms. As noted above, the delta-$Na_2SiO_5$ (NaSKS-6 form) is most preferred for use herein. Other silicates may also be useful such as for example magnesium silicate, which can serve as a crispening agent in granular formulations, as a stabilizing agent for oxygen bleaches, and as a component of suds control systems.

Examples of carbonate builders are the alkaline earth and alkali metal carbonates as disclosed in German Patent Application No. 2,321,001 published on Nov. 15, 1973.

Aluminosilicate builders are useful in the present invention. Aluminosilicate builders are of great importance in most currently marketed heavy duty granular detergent compositions, and can also be a significant builder ingredient in liquid detergent formulations. Aluminosilicate builders include those having the empirical formula:

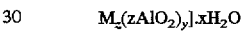

$$M_z[(zAlO_2)_y] \cdot xH_2O$$

wherein z and y are integers of at least 6, the molar ratio of z to y is in the range from 1.0 to about 0.5, and x is an integer from about 15 to about 264.

Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669, Krummel, et al, issued Oct. 12, 1976. Preferred synthetic crystalline aluminosilicate ion exchange materials useful herein are available under the designations Zeolite A, Zeolite P (B), Zeolite MAP and Zeolite X. In an especially preferred embodiment, the crystalline aluminosilicate ion exchange material has the formula:

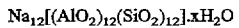

$$Na_{12}[(AlO_2)_{12}(SiO_2)_{12}] \cdot xH_2O$$

wherein x is from about 20 to about 30, especially about 27. This material is known as Zeolite A. Dehydrated zeolites (x=0–10) may also be used herein. Preferably, the aluminosilicate has a particle size of about 0.1–10 microns in diameter.

Organic detergent builders suitable for the purposes of the present invention include, but are not restricted to, a wide variety of polycarboxylate compounds. As used herein, "polycarboxylate" refers to compounds having a plurality of carboxylate groups, preferably at least 3 carboxylates. Polycarboxylate builder can generally be added to the composition in acid form, but can also be added in the form of a neutralized salt. When utilized in salt form, alkali metals, such as sodium, potassium, and lithium, or alkanolammonium salts are preferred.

Included among the polycarboxylate builders are a variety of categories of useful materials. One important category of polycarboxylate builders encompasses the ether polycarboxylates, including oxydisuccinate, as disclosed in Berg, U.S. Pat. No. 3,128,287, issued Apr. 7, 1964, and Lamberti et al, U.S. Pat. No. 3,635,830, issued Jan. 18, 1972. See also "TMS/TDS" builders of U.S. Pat. No. 4,663,071, issued to Bush et al, on May 5, 1987. Suitable ether polycarboxylates also include cyclic compounds, particularly alicyclic compounds, such as those described in U.S. Pat. Nos. 3,923,679; 3,835,163; 4,158,635; 4,120,874 and 4,102,903.

Other useful detergency builders include the ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Citrate builders, e.g., citric acid and soluble salts thereof (particularly sodium salt), are polycarboxylate builders of particular importance for heavy duty liquid detergent formulations due to their availability from renewable resources and their biodegradability. Citrates can also be used in granular compositions, especially in combination with zeolite and/or layered silicate builders. Oxydisuccinates are also especially useful in such compositions and combinations.

Also suitable in the detergent compositions of the present invention are the 3,3-dicarboxy-4-oxa-1,6-hexanedioates and the related compounds disclosed in U.S. Pat. No. 4,566,984, Bush, issued Jan. 28, 1986. Useful succinic acid builders include the $C_5$–$C_{20}$ alkyl and alkenyl succinic acids and salts thereof. A particularly preferred compound of this type is dodecenylsuccinic acid. Specific examples of succinate builders include: laurylsuccinate, myristylsuccinate, palmitylsuccinate, 2-dodecenylsuccinate (preferred), 2-pentadecenylsuccinate, and the like. Laurylsuccinates are the preferred builders of this group, and are described in European Patent Application 86200690.5/0,200,263, published Nov. 5, 1986.

Other suitable polycarboxylates are disclosed in U.S. Pat. No. 4,144,226, Crutchfield et al, issued Mar. 13, 1979 and in U.S. Pat. No. 3,308,067, Diehl, issued Mar. 7, 1967. See also Diehl U.S. Pat. No. 3,723,322.

Fatty acids, e.g., $C_{12}$–$C_{18}$ monocarboxylic acids, can also be incorporated into the compositions alone, or in combination with the aforesaid builders, especially citrate and/or the succinate builders, to provide additional builder activity. Such use of fatty acids will generally result in a diminution of sudsing, which should be taken into account by the formulator.

In situations where phosphorus-based builders can be used, and especially in the formulation of bars used for hand-laundering operations, the various alkali metal phosphates such as the well-known sodium tripolyphosphates, sodium pyrophosphate and sodium orthophosphate can be used. Phosphonate builders such as ethane-1-hydroxy- 1,1-diphosphonate and other known phosphonates (see, for example, U.S. Pat. Nos. 3,159,581; 3,213,030; 3,422,021; 3,400,148 and 3,422,137) can also be used.

Polymeric Soil Release Agents—Any polymeric soil release agent known to those skilled in the art can optionally be employed in the compositions and processes of this invention. Polymeric soil release agents are characterized by having both hydrophilic segments, to hydrophilize the surface of hydrophobic fibers, such as polyester and nylon, and hydrophobic segments, to deposit upon hydrophobic fibers and remain adhered thereto through completion of washing and rinsing cycles and, thus, serve as an anchor for the hydrophilic segments. This can enable stains occurring subsequent to treatment with the soil release agent to be more easily cleaned in later washing procedures.

The polymeric soil release agents useful herein especially include those soil release agents having: (a) one or more nonionic hydrophile components consisting essentially of (i) polyoxyethylene segments with a degree of polymerization of at least 2, or (ii) oxypropylene or polyoxypropylene segments with a degree of polymerization of from 2 to 10, wherein said hydrophile segment does not encompass any oxypropylene unit unless it is bonded to adjacent moieties at each end by ether linkages, or (iii) a mixture of oxyalkylene units comprising oxyethylene and from 1 to about 30 oxypropylene units wherein said mixture contains a sufficient amount of oxyethylene units such that the hydrophile component has hydrophilicity great enough to increase the hydrophilicity of conventional polyester synthetic fiber surfaces upon deposit of the soil release agent on such surface, said hydrophile segments preferably comprising at least about 25% oxyethylene units and more preferably, especially for such components having about 20 to 30 oxypropylene units, at least about 50% oxyethylene units; or (b) one or more hydrophobe components comprising (i) $C_3$ oxyalkylene terephthalate segments, wherein, if said hydrophobe components also comprise oxyethylene terephthalate, the ratio of oxyethylene terephthalate:$C_3$ oxyalkylene terephthalate units is about 2:1 or lower, (ii) $C_4$–$C_6$ alkylene or oxy $C_4$–$C_6$ alkylene segments, or mixtures therein, (iii) poly (vinyl ester) segments, preferably polyvinyl acetate), having a degree of polymerization of at least 2, or (iv) $C_1$–$C_4$ alkyl ether or $C_4$ hydroxyalkyl ether substituents, or mixtures therein, wherein said substituents are present in the form of $C_1$–$C_4$ alkyl ether or $C_4$ hydroxyalkyl ether cellulose derivatives, or mixtures therein, and such cellulose derivatives are amphiphilic, whereby they have a sufficient level of $C_1$–$C_4$ alkyl ether and/or $C_4$ hydroxyalkyl ether units to deposit upon conventional polyester synthetic fiber surfaces and retain a sufficient level of hydroxyls, once adhered to such conventional synthetic fiber surface, to increase fiber surface hydrophilicity, or a combination of (a) and (b).

Typically, the polyoxyethylene segments of (a)(i) will have a degree of polymerization of up to about 200, although higher levels can be used, preferably from 3 to about 150, more preferably from 6 to about 100. Suitable oxy $C_4$–$C_6$ alkylene hydrophobe segments include, but are not limited to, end-caps of polymeric soil release agents such as $MO_3S$ $(CH_2)_nOCH_2CH_2O$—, where M is sodium and n is an integer from 4–6, as disclosed in U.S. Pat. No. 4,721,580, issued Jan. 26, 1988 to Gosselink.

Polymeric soil release agents useful in the present invention also include cellulosic derivatives such as hydroxyether cellulosic polymers, and the like. Such agents are commercially available and include hydroxyethers of cellulose such as METHOCEL (Dow). Cellulosic soil release agents for use herein also include those selected from the group consisting of $C_1$–$C_4$ alkyl and $C_4$ hydroxyalkyl cellulose; see U.S. Pat. No. 4,000,093, issued Dec. 28, 1976 to Nicol, et al.

Soil release agents characterized by poly(vinyl ester) hydrophobe segments include graft copolymers of poly (vinyl ester), e.g., $C_1$–$C_6$ vinyl esters, preferably poly(vinyl acetate) grafted onto polyalkylene oxide backbones, such as polyethylene oxide backbones. See European Patent Application 0 219 048, published Apr. 22, 1987 by Kud, et al. Commercially available soil release agents of this kind include the SOKALAN type of material, e.g., SOKALAN HP-22, available from BASF (Germany).

One type of preferred soil release agent is a copolymer having random blocks of ethylene terephthalate and polyethylene oxide (PEO) terephthalate. The molecular weight of this polymeric soil release agent is in the range of from about 25,000 to about 55,000. See U.S. Pat. No. 3,959,230 to Hays, issued May 25, 1976 and U.S. Pat. No. 3,893,929 to Basadur issued Jul. 8, 1975.

Another preferred polymeric soil release agent is a polyester with repeat units of ethylene terephthalate units contains 10–15% by weight of ethylene terephthalate units together with 90–80% by weight of polyoxyethylene terephthalate units, derived from a polyoxyethylene glycol of average molecular weight 300–5,000. Examples of this polymer include the commercially available material ZELCON 5126 (from Dupont) and MILEASE T (from ICI). See also U.S. Pat. No. 4,702,857, issued Oct. 27, 1987 to Gosselink.

Another preferred polymeric soil release agent is a sulfonated product of a substantially linear ester oligomer comprised of an oligomeric ester backbone of terephthaloyl and oxyalkyleneoxy repeat units and terminal moieties covalently attached to the backbone. These soil release agents are described fully in U.S. Pat. No. 4,968,451, issued Nov. 6, 1990 to J. J. Scheibel and E. P. Gosselink. Other suitable polymeric soil release agents include the terephthalate polyesters of U.S. Pat. No. 4,711,730, issued Dec. 8, 1987 to Gosselink et al, the anionic end-capped oligomeric esters of U.S. Pat. No. 4,721,580, issued Jan. 26, 1988 to Gosselink, and the block polyester oligomeric compounds of U.S. Pat. No. 4,702,857, issued Oct. 27, 1987 to Gosselink.

Preferred polymeric soil release agents also include the soil release agents of U.S. Pat. No. 4,877,896, issued Oct. 31, 1989 to Maldonado et al, which discloses anionic, especially sulfoaroyl, end-capped terephthalate esters.

Still another preferred soil release agent is an oligomer with repeat units of terephthaloyl units, sulfoisoterephthaloyl units, oxyethyleneoxy and oxy-1,2-propylene units. The repeat units form the backbone of the oligomer and are preferably terminated with modified isethionate end-caps. A particularly preferred soil release agent of this type comprises about one sulfoisophthaloyl unit, 5 terephthaloyl units, oxyethyleneoxy and oxy-1,2-propyleneoxy units in a ratio of from about 1.7 to about 1.8, and two end-cap units of sodium 2-(2-hydroxyethoxy)ethanesulfonate. Said soil release agent also comprises from about 0.5% to about 20%, by weight of the oligomer, of a crystalline-reducing stabilizer, preferably selected from the group consisting of xylene sulfonate, cumene sulfonate, toluene sulfonate, and mixtures thereof.

If utilized, soil release agents will generally comprise from about 0.01% to about 10.0%, by weight, of the detergent compositions herein, typically from about 0.1% to about 5%, preferably from about 0.2% to about 3.0%.

Chelating Agents—The detergent compositions herein may also optionally contain one or more iron and/or manganese chelating agents in addition to the materials of the present invention. Such chelating agents can be selected from the group consisting of amino carboxylates, amino phosphonates, polyfunctionally-substituted aromatic chelating agents and mixtures therein, all as hereinafter defined. Without intending to be bound by theory, it is believed that the benefit of these materials is due in part to their exceptional ability to remove iron and manganese ions from washing solutions by formation of soluble chelates. In some cases, a conventional chelant in the laundry wash product may function in part to "regenerate" the fabric substantive chelants. This is accomplished when the heavy metal chelant of the present invention while remaining adsorbed to the fabric surface, exchanges any presently bound heavy metal ion to a conventional chelant. The metal exchanged is carried away with the conventional metal chelant, while the heavy metal chelant of the present invention, still substantively held on the fabric is free to chelate a new metal ion (i.e., in a subsequent rinse cycle).

Amino carboxylates useful as optional chelating agents include ethylenediaminetetracetates, N-hydroxyethylethylenediaminetriacetates, nitrilotriacetates, ethylenediamine tetraprorionates, triethylenetetraaminehexacetates, diethylenetriaminepentaacetates, and ethanoldiglycines, alkali metal, ammonium, and substituted ammonium salts therein and mixtures therein.

Amino phosphonates are also suitable for use as chelating agents in the compositions of the invention when at lease low levels of total phosphorus are permitted in detergent compositions, and include ethylenediaminetetrakis (methylenephosphonates) as DEQUEST. Preferred, these amino phosphonates to not contain alkyl or alkenyl groups with more than about 6 carbon atoms.

Polyfunctionally-substituted aromatic chelating agents are also useful in the compositions herein. See U.S. Pat. No. 3,812,044, issued May 21, 1974, to Connor et al. Preferred compounds of this type in acid form are dihydroxydisulfobenzenes such as 1,2-dihydroxy-3,5-disulfobenzene.

A preferred biodegradable chelator for use herein is ethylenediamine disuccinate ("EDDS"), especially the [S,S] isomer as described in U.S. Pat. No. 4,704,233, Nov. 3, 1987, to Hartman and Perkins.

If utilized, these chelating agents will generally comprise from about 0.1% to about 10% by weight of the detergent compositions herein. More preferably, if utilized, the chelating agents will comprise from about 0.1% to about 3.0% by weight of such compositions.

Clay Soil Removal/Anti-redeposition Agents—The compositions of the present invention can also optionally contain water-soluble ethoxylated amines having clay soil removal and antiredeposition properties. Granular detergent compositions which contain these compounds typically contain from about 0.01% to about 10.0% by weight of the water-soluble ethoxylates amines; liquid detergent compositions typically contain about 0.01% to about 5%.

The most preferred soil release and anti-redeposition agent is ethoxylated tetraethylenepentamine. Exemplary ethoxylated amines are further described in U.S. Pat. No. 4,597,898, VanderMeer, issued Jul. 1, 1986. Another group of preferred clay soil removal-antiredeposition agents are the cationic compounds disclosed in European Patent Application 111,965, Oh and Gosselink, published Jun. 27, 1984. Other clay soil removal/antiredeposition agents which can be used include the ethoxylated amine polymers disclosed in European Patent Application 111,984, Gosselink, published Jun. 27, 1984; the zwitterionic polymers disclosed in European Patent Application 112,592, Gosselink, published Jul. 4, 1984; and the amine oxides disclosed in U.S. Pat. No. 4,548,744, Connor, issued Oct. 22, 1985. Other clay soil removal and/or anti redeposition agents known in the art can also be utilized in the compositions herein. Another type of preferred antiredeposition agent includes the carboxy methyl cellulose (CMC) materials. These materials are well known in the art.

Polymeric Dispersing Agents—Polymeric dispersing agents can advantageously be utilized at levels from about 0.1% to about 7%, by weight, in the compositions herein, especially in the presence of zeolite and/or layered silicate builders. Suitable polymeric dispersing agents include polymeric polycarboxylates and polyethylene glycols, although others known in the art can also be used. It is believed, though it is not intended to be limited by theory, that polymeric dispersing agents enhance overall detergent builder performance, when used in combination with other builders (including lower molecular weight polycarboxylates) by crystal growth inhibition, particulate soil release peptization, and anti-redeposition.

Polymeric polycarboxylate materials can be prepared by polymerizing or copolymerizing suitable unsaturated monomers, preferably in their acid form. Unsaturated monomeric acids that can be polymerized to form suitable polymeric polycarboxylates include acrylic acid, maleic acid (or maleic anhydride), fumaric acid, itaconic acid, aconitic acid, mesaconic acid, citraconic acid and methylenemalonic acid. The presence in the polymeric polycarboxylates herein or monomeric segments, containing no carboxylate radicals such as vinylmethyl ether, styrene, ethylene, etc. is suitable provided that such segments do not constitute more than about 40% by weight.

Particularly suitable polymeric polycarboxylates can be derived from acrylic acid. Such acrylic acid-based polymers which are useful herein are the water-soluble salts of polymerized acrylic acid. The average molecular weight of such polymers in the acid form preferably ranges from about 2,000 to 10,000, more preferably from about 4,000 to 7,000 and most preferably from about 4,000 to 5,000. Water-soluble salts of such acrylic acid polymers can include, for example, the alkali metal, ammonium and substituted ammonium salts. Soluble polymers of this type are known materials. Use of polyacrylates of this type in detergent compositions has been disclosed, for example, in Diehl, U.S. Pat. No. 3,308,067, issued Mar. 7, 1967.

Acrylic/maleic-based copolymers may also be used as a preferred component of the dispersing/anti-redeposition agent. Such materials include the water-soluble salts of copolymers of acrylic acid and maleic acid. The average molecular weight of such copolymers in the acid form preferably ranges from about 2,000 to 100,000, more preferably from about 5,000 to 75,000, most preferably from about 7,000 to 65,000. The ratio of acrylate to maleate segments in such copolymers will generally range from about 30:1 to about 1:1, more preferably from about 10:1 to 2:1. Water-soluble salts of such acrylic acid/maleic acid copolymers can include, for example, the alkali metal, ammonium and substituted ammonium salts. Soluble acrylate/maleate copolymers of this type are known materials which are described in European Patent Application No. 66915, published Dec. 15, 1982, as well as in EP 193,360, published Sep. 3, 1986, which also describes such polymers comprising hydroxypropylacrylate. Still other useful dispersing agents include the maleic/acrylic/vinyl alcohol terpolymers. Such materials are also disclosed in EP 193,360, including, for example, the 45/45/10 terpolymer of acrylic/maleic/vinyl alcohol.

Another polymeric material which can be included is polyethylene glycol (PEG). PEG can exhibit dispersing agent performance as well as act as a clay soil removal-antiredeposition agent. Typical molecular weight ranges for these purposes range from about 500 to about 100,000, preferably from about 1,000 to about 50,000, more preferably from about 1,500 to about 10,000.

Polyaspartate and polyglutamate dispersing agents may also be used, especially in conjunction with zeolite builders.

Dispersing agents such as polyaspartate preferably have a molecular weight (avg.) of about 10,000.

Suds Suppressors—Compounds for reducing or suppressing the formation of suds can be incorporated into the compositions of the present invention. Suds suppression can be of particular importance in the so-called "high concentration cleaning process" as described in U.S. Pat. Nos. 4,489,455 and 4,489,574 and in front-loading European-style washing machines.

A wide variety of materials may be used as suds suppressors, and suds suppressors are well known to those skilled in the art. See, for example, Kirk Othmer Encyclopedia of Chemical Technology, Third Edition, Volume 7, pages 430–447 (John Wiley & Sons, Inc., 1979). One category of suds suppressor of particular interest encompasses monocarboxylic fatty acid and soluble salts therein. See U.S. Pat. No. 2,954,347, issued Sep. 27, 1960 to Wayne St. John. The monocarboxylic fatty acids and salts thereof used as suds suppressor typically have hydrocarbyl chains of 10 to about 24 carbon atoms, preferably 12 to 18 carbon atoms. Suitable salts include the alkali metal salts such as sodium, potassium, and lithium salts, and ammonium and alkanolammonium salts.

The detergent compositions herein may also contain non-surfactant suds suppressors. These include, for example: high molecular weight hydrocarbons such as paraffin, fatty acid esters (e.g., fatty acid triglycerides), fatty acid esters of monovalent alcohols, aliphatic $C_{18}$–$C_{40}$ ketones (e.g., stearone), etc. Other suds inhibitors include N-alkylated amino triazines such as tri- to hexa-alkylmelamines or di- to tetra-alkyldiamine chlortriazines formed as products of cyanuric chloride with two or three moles of a primary or secondary amine containing 1 to 24 carbon atoms, propylene oxide, and monostearyl phosphates such as monostearyl alcohol phosphate ester and monostearyl di-alkali metal (e.g., K, Na, and Li) phosphates and phosphate esters. The hydrocarbons such as paraffin and haloparaffin can be utilized in liquid form. The liquid hydrocarbons will be liquid at room temperature and atmospheric pressure, and will have a pour point in the range of about –40° C. and about 50° C., and a minimum boiling point not less than about 110° C. (atmospheric pressure). It is also known to utilize waxy hydrocarbons, preferably having a melting point below about 100° C. The hydrocarbons constitute a preferred category of suds suppressor for detergent compositions. Hydrocarbon suds suppressors are described, for example, in U.S. Pat. No. 4,265,779, issued May 5, 1981 to Gandolfo et al. The hydrocarbons, thus, include aliphatic, alicyclic, aromatic, and heterocyclic saturated or unsaturated hydrocarbons having from about 12 to about 70 carbon atoms. The term "paraffin," as used in this suds suppressor discussion, is intended to include mixtures of true paraffins and cyclic hydrocarbons.

Another preferred category of non-surfactant suds suppressors comprises silicone suds suppressors. This category includes the use of polyorganosiloxane oils, such as polydimethylsiloxane, dispersions or emulsions of polyorganosiloxane oils or resins, and combinations of polyorganosiloxane with silica particles wherein the polyorganosiloxane is chemisorbed or fused onto the silica. Silicone suds suppressors are well known in the art and are, for example, disclosed in U.S. Pat. No. 4,265,779, issued May 5, 1981 to Gandolfo et al and European Patent Application No. 89307851.9, published Feb. 7, 1990, by Starch, M. S.

Other silicone suds suppressors are disclosed in U.S. Pat. No. 3,455,839 which relates to compositions and processes for defoaming aqueous solutions by incorporating therein small amounts of polydimethylsiloxane fluids.

Mixtures of silicone and silanated silica are described, for instance, in German Patent Application DOS 2,124,526. Silicone defoamers and suds controlling agents in granular detergent compositions are disclosed in U.S. Pat. No. 3,933,672, Bartolotta et al, and in U.S. Pat. No. 4,652,392, Baginski et al, issued Mar. 24, 1987.

An exemplary silicone based suds suppressor for use herein is a suds suppressing amount of a suds controlling agent consisting essentially of:

(i) polydimethylsiloxane fluid having a viscosity of from about 20 cs. to about 1,500 cs. at 25° C.;

(ii) from about 5 to about 50 parts per 100 parts by weight of (i) of siloxane resin composed of $(CH_3)_3SiO_{1/2}$ units of $SiO_2$ units in a ratio of from $(CH_3)_3 SiO_{1/2}$ units and to $SiO_2$ units of from about 0.6:1 to about 1.2: 1; and (iii) from about 1 to about 20 parts per 100 parts by weight of (i) of a solid silica gel.

In the preferred silicone suds suppressor used herein, the solvent for a continuous phase is made up of certain polyethylene glycols or polyethylene-polypropylene glycol copolymers or mixtures thereof (preferred), or polypropylene glycol. The primary silicone suds suppressor is branched/crosslinked and preferably not linear.

To illustrate this point further, typical liquid laundry detergent compositions with controlled suds will optionally comprise from about 0.001 to about 1, preferably from about 0.01 to about 0.7, most preferably from about 0.05 to about 0.5, weight % of said silicone suds suppressor, which comprises (1) a nonaqueous emulsion of a primary antifoam agent which is a mixture of (a) a polyorganosiloxane, (b) a resinous siloxane or a silicone resin-producing silicone compound, (c) a finely divided filler material, and (d) a catalyst to promote the reaction of mixture components (a), (b) and (c), to form silanolates; (2) at least one nonionic silicone surfactant; and (3) polyethylene glycol or a copolymer of polyethylene-polypropylene glycol having a solubility in water at room temperature of more than about 2 weight %; and without polypropylene glycol. Similar amounts can be used in granular compositions, gels, etc. See also U.S. Pat. No. 4,978,471, Starch, issued Dec. 18, 1990, and U.S. Pat. No. 4,983,316, Starch, issued Jan. 8, 1991, U.S. Pat. No. 5,288,431, Huber et al., issued Feb. 22, 1994, and U.S. Pat. Nos. 4,639,489 and 4,749,740, Aizawa et al at column 1, line 46 through column 4, line 35.

The silicone suds suppressor herein preferably comprises polyethylene glycol and a copolymer of polyethylene glycol/polypropylene glycol, all having an average molecular weight of less than about 1,000, preferably between about 100 and 800. The polyethylene glycol and polyethylene/polypropylene glycol copolymers herein have a solubility in water at room temperature of more than about 2 weight %, preferably more than about 5 weight %.

The preferred solvent herein is polyethylene glycol having an average molecular weight of less than about 1,000, more preferably between about 100 and 800, most preferably between about 200 and 400, and a copolymer of polyethylene glycol/polypropylene glycol, preferably PPG 200/PEG 300. Preferred is a weight ratio of between about 1:1 and 1:10, most preferably between 1:3 and 1:6, of polyethylene glycol:copolymer of polyethylene-polypropylene glycol.

Other suds suppressors useful herein comprise the secondary alcohols (e.g., 2-alkyl alkanols) and mixtures of such alcohols with silicone oils, such as the silicones disclosed in U.S. Pat. Nos. 4,798,679, 4,075,118 and EP 150,872. The secondary alcohols include the $C_6$–$C_{16}$ alkyl alcohols having a $C_1$–$C_{16}$ chain. A preferred alcohol is 2-butyl octanol, which is available from Condea under the trademark ISO-FOL 12. Mixtures of secondary alcohols are available under the trademark ISALCHEM 123 from Enichem. Mixed suds suppressors typically comprise mixtures of alcohol+ silicone at a weight ratio of 1:5 to 5:1.

For any detergent compositions to be used in automatic laundry washing machines, suds should not form to the extent that they overflow the machine. Suds suppressors, when utilized, are preferably present in a "suds suppressing amount". By "suds suppressing amount" is meant that the formulator of the composition can select an amount of this suds controlling agent that will sufficiently control the suds to result in a low-sudsing laundry detergent for use in automatic laundry washing machines.

The compositions herein will generally comprise from 0% to about 5% of suds suppressor. When utilized as suds suppressors, monocarboxylic fatty acids, and salts therein, will be present typically in amounts up to about 5%, by weight, of the detergent composition. Preferably, from about 0.5% to about 3% of fatty monocarboxylate suds suppressor is utilized. Silicone suds suppressors are typically utilized in amounts up to about 2.0%, by weight, of the detergent composition, although higher amounts may be used. This upper limit is practical in nature, due primarily to concern with keeping costs minimized and effectiveness of lower amounts for effectively controlling sudsing. Preferably from about 0.01% to about 1% of silicone suds suppressor is used, more preferably from about 0.25% to about 0.5%. As used herein, these weight percentage values include any silica that may be utilized in combination with polyorganosiloxane, as well as any adjunct materials that may be utilized. Monostearyl phosphate suds suppressors are generally utilized in amounts ranging from about 0.1% to about 2%, by weight, of the composition. Hydrocarbon suds suppressors are typically utilized in amounts ranging from about 0.01% to about 5.0%, although higher levels can be used. The alcohol suds suppressors are typically used at 0.2%–3% by weight of the finished compositions.

Brightener—Any conventional optical brighteners or other brightening or whitening agents known in the art can be incorporated at levels typically from about 0.05% to about 1.2%, by weight, into the detergent compositions herein. Commercial optical brighteners which may be useful in the present invention can be classified into subgroups, which include, but are not necessarily limited to, derivatives of stilbene, pyrazoline, coumarin, carboxylic acid, methinecyanines, dibenzothiphene-5,5-dioxide, azoles, 5- and 6-membered-ring heterocycles, and other miscellaneous agents. Examples of such brighteners are disclosed in "The Production and Application of Fluorescent Brightening Agents", M. Zahradnik, Published by John Wiley & Sons, New York (1982).

Specific examples of optical brighteners which are useful in the present compositions are those identified in U.S. Pat. No. 4,790,856, issued to Wixon on Dec. 13, 1988. These brighteners include the PHORWHITE series of brighteners from Verona. Other brighteners disclosed in this reference include: Tinopal UNPA, Tinopal CBS and Tinopal 5BM; available from Ciba-Geigy; Artic White CC and Artic White CWD, available from Hilton-Davis, located in Italy; the 2-(4-stryl-phenyl)-2H-napthol[1,2-d]triazoles; 4,4'-bis-(1,2, 3-triazol-2-yl)-stil- benes; 4,4'-bis(stryl)bisphenyls; and the aminocoumarins. Specific examples of these brighteners include 4-methyl-7-diethyl-amino coumarin; 1,2-bis(-venzimidazol-2-yl)ethylene; 1,3-diphenyl-phrazolines; 2,5-bis(benzoxazol-2-yl)thiophene; 2-stryl-napth-[1,2-d]oxazole; and 2-(stilbene-4-yl)-2H-naphtho-[1,2-d]triazole. See also U.S. Pat. No. 3,646,015, issued Feb. 29, 1972 to Hamilton. Anionic brighteners are preferred herein.

Fabric Softeners—Various through-the-wash fabric softeners, especially the impalpable smectite clays of U.S. Pat. No. 4,062,647, Storm and Nirschl, issued Dec. 13, 1977, as well as other softener clays known in the art, can optionally be used typically at levels of from about 0.5% to about 10% by weight in the present compositions to provide fabric softener benefits concurrently with fabric cleaning. Clay softeners can be used in combination with amine and cationic softeners as disclosed, for example, in U.S. Pat. No. 4,375,416, Crisp et al, Mar. 1, 1983 and U.S. Pat. No. 4,291,071, Harris et al, issued Sep. 22, 1981.

Other Ingredients—A wide variety of other ingredients useful in detergent compositions can be included in the compositions herein, including other active ingredients, carriers, hydrotropes, processing aids, dyes or pigments, solvents for liquid formulations, solid fillers for bar compositions, etc. If high sudsing is desired, suds boosters such as the $C_{10}$–$C_{16}$ alkanolamides can be incorporated into the compositions, typically at 1%–10% levels. The $C_{10}$–$C_{14}$ monoethanol and diethanol amides illustrate a typical class of such suds boosters. Use of such suds boosters with high sudsing adjunct surfactants such as the amine oxides, betaines and sultaines noted above is also advantageous. If desired, soluble magnesium salts such as $MgCl_2$, $MgSO_4$, and the like, can be added at levels of, typically, 0. 1%–2%, to provide additional suds and to enhance grease removal performance.

Various detersive ingredients employed in the present compositions optionally can be further stabilized by absorbing said ingredients onto a porous hydrophobic substrate, then coating said substrate with a hydrophobic coating. Preferably, the detersive ingredient is admixed with a surfactant before being absorbed into the porous substrate. In use, the detersive ingredient is released from the substrate into the aqueous washing liquor, where it performs its intended detersive function.

To illustrate this technique in more detail, a porous hydrophobic silica (trademark SIPERNAT D10, DeGussa) is admixed with a proteolytic enzyme solution containing 3%–5% of $C_{13}$–$_{15}$ ethoxylated alcohol (EO 7) nonionic surfactant. Typically, the enzyme/surfactant solution is 2.5× the weight of silica. The resulting powder is dispersed with stirring in silicone oil (various silicone oil viscosity in the range of 500–12,500 can be used). The resulting silicone oil dispersion is emulsified or otherwise added to the final detergent matrix. By this means, ingredients such as the aforementioned enzymes, bleaches, bleach activators, bleach catalysts, photoactivators, dyes, fluorescers, fabric conditioners and hydrolyzable surfactants can be "protected" for use in detergents, including liquid laundry detergent compositions.

Liquid detergent compositions can contain water and other solvents as carriers. Low molecular weight primary or secondary alcohols exemplified by methanol, ethanol, propanol, and isopropanol are suitable. Monohydric alcohols are preferred for solubilizing surfactant, but polyols such as those containing from 2 to about 6 carbon atoms and from 2 to about 6 hydroxy groups (e.g., 1,3-propanediol, ethylene glycol, glycerin, and 1,2-propanediol) can also be used. The compositions may contain from 5% to 90%, typically 10% to 50% of such carriers.

The detergent compositions herein will preferably be formulated such that, during use in aqueous cleaning operations, the wash water will have a pH of between about 6.5 and about 11, preferably between about 7.5 and 10.5. Liquid dishwashing product formulations preferably have a pH between about 6.8 and about 9.0. Laundry products are typically at pH 9–11. Techniques for controlling pH at recommended usage levels include the use of buffers, alkalis, acids, etc., and are well known to those skilled in the art.

Dye Transfer Inhibiting Agents—The compositions of the present invention may also include one or more materials effective for inhibiting the transfer of dyes from one fabric to another during the cleaning process. Generally, such dye transfer inhibiting agents include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents typically comprise from about 0.01% to about 10% by weight of the composition, preferably from about 0.01% to about 5%, and more preferably from about 0.05% to about 2%.

More specifically, the polyamine N-oxide polymers preferred for use herein contain units having the following structural formula: R—$A_x$—P; wherein P is a polymerizable unit to which an N—O group can be attached or the N—O group can form part of the polymerizable unit or the N—O group can be attached to both units; A is one of the following structures: —NC(O)—, —C(O)O—, —S—, —O—, —N=; x is 0 or 1; and R is aliphatic, ethoxylated aliphatics, aromatics, heterocyclic or alicyclic groups or any combination thereof to which the nitrogen of the N—O group can be attached or the N—O group is part of these groups. Preferred polyamine N-oxides are those wherein R is a heterocyclic group such as pyridine, pyrrole, imidazole, pyrrolidine, piperidine and derivatives thereof.

The N—O group can be represented by the following general structures:

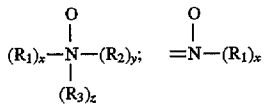

wherein $R_1$, $R_2$, $R_3$ are aliphatic, aromatic, heterocyclic or alicyclic groups or combinations thereof; x, y and z are 0 or 1; and the nitrogen of the N—O group can be attached or form part of any of the aforementioned groups. The amine oxide unit of the polyamine N-oxides has a pKa<10, preferably pKa<7, more preferred pKa<6.

Any polymer backbone can be used as long as the amine oxide polymer formed is water-soluble and has dye transfer inhibiting properties. Examples of suitable polymeric backbones are polyvinyls, polyalkylenes, polyesters, polyethers, polyamide, polyimides, polyacrylates and mixtures thereof. These polymers include random or block copolymers where one monomer type is an amine N-oxide and the other monomer type is an N-oxide. The amine N-oxide polymers typically have a ratio of amine to the amine N-oxide of 10:1 to 1:1,000,000. However, the number of amine oxide groups present in the polyamine oxide polymer can be varied by appropriate copolymerization or by an appropriate degree of N-oxidation. The polyamine oxides can be obtained in almost any degree of polymerization. Typically, the average molecular weight is within the range of 500 to 1,000,000; more preferred 1,000 to 500,000; most preferred 5,000 to 100,000. This preferred class of materials can be referred to as "PVNO".

The most preferred polyamine N-oxide useful in the detergent compositions herein is poly(4-vinylpyridine-N-oxide) which as an average molecular weight of about 50,000 and an amine to amine N-oxide ratio of about 1:4.

Copolymers of N-vinylpyrrolidone and N-vinylimidazole polymers (referred to as a class as "PVPVI") are also preferred for use herein. Preferably the PVPVI has an average molecular weight range from 5,000 to 1,000,000, more preferably from 5,000 to 200,000, and most preferably from 10,000 to 20,000. (The average molecular weight range is determined by light scattering as described in Barth, et al., *Chemical Analysis*, Vol 113. "Modern Methods of Polymer Characterization", the disclosures of which are incorporated herein by reference.) The PVPVI copolymers typically have a molar ratio of N-vinylimidazole to N-vinylpyrrolidone from 1:1 to 0.2:1, more preferably from 0.8:1 to 0.3:1, most preferably from 0.6:1 to 0.4:1. These copolymers can be either linear or branched.

The present invention compositions also may employ a polyvinylpyrrolidone ("PVP") having an average molecular weight of from about 5,000 to about 400,000, preferably from about 5,000 to about 200,000, and more preferably from about 5,000 to about 50,000. PVP's are known to persons skilled in the detergent field; see, for example, EP-A-262,897 and EP-A-256,696, incorporated herein by reference. Compositions containing PVP can also contain polyethylene glycol ("PEG") having an average molecular weight from about 500 to about 100,000, preferably from about 1,000 to about 10,000. Preferably, the ratio of PEG to PVP on a ppm basis delivered in wash solutions is from about 2:1 to about 50:1, and more preferably from about 3:1 to about 0:1.

The following non-limiting examples illustrate the use of a composition of the present invention for control of heavy metal ions as applied to cotton, synthetic, and cotton/synthetic blends of white and colored fabric for thru-the-wash protection against color fading and yellow/dinginess build-up on whites.

EXAMPLES 1–5

The following describe heavy duty granular detergent compositions according to the present invention comprising heavy metal ion chelants:

| Ingredients | 1 | 2 | 3 | 4 | 5 |
|---|---|---|---|---|---|
| Na $C_{11}$–$C_{13}$ alkylbenzenesulfonate | 13.3 | 9.4 | 21.0 | 3.5 | 17.0 |
| Na $C_{14}$–$C_{15}$ alcohol sulfate | 3.9 | 11.3 | 0.0 | 8.7 | 0.0 |
| Na $C_{14}$–$C_{15}$ alcoholEO$_{0.5-3}$ sulfate | 2.0 | 1.0 | 0.0 | 1.2 | 0.0 |
| Na $C_{14}$–$C_{15}$ alcoholEO$_{6.5}$ tallow fatty acid | 0.5 | 1.5 | 1.2 | 7.0 | 0.0 |
| Sodium tripolyphosphate | 0.0 | 0.0 | 35.0 | 0.0 | 21.0 |
| Zeolite A, hydrate (0.1–10μ) | 0.0 | 0.0 | 16.0 | 18.2 | 0.0 |
| Sodium carbonate | 26.3 | 27.2 | 20.0 | 6.8 | 6.0 |
| Sodium bicarbonate | 0.0 | 0.0 | 0.0 | 12.9 | 0.0 |
| Sodium polyacrylate (45%) | 23.9 | 2.3 | 0.0 | 2.0 | 0.9 |
| Sodium Silicate (1:6 NaO/SiO$_2$) (46%) | 3.4 | 0.6 | 2.0 | 1.0 | 8.5 |
| Alumino silicate | 0.0 | 27.8 | 0.0 | 0.0 | 0.0 |
| Sodium sulfate | 2.4 | 5.3 | 0.0 | 10.0 | 0.0 |
| Sodium perborate | 10.5 | 1.0 | 0.0 | 0.0 | 0.0 |
| Poly(ethyleneglycol) MW ~4000 (50%) | 1.0 | 1.6 | 0.0 | 0.0 | 0.0 |
| Citric acid | 1.7 | 0.0 | 0.0 | 2.5 | 0.0 |
| Heavy metal chelant according to Example 9 | 0.5 | 0.0 | 0.0 | 0.7 | 0.0 |
| Heavy metal chelant according to Example 13 | 0.0 | 1.0 | 0.8 | 0.0 | 0.8 |
| Adjunct materials and fillers | balance | balance | balance | balance | balance |

EXAMPLES 6–8

The following describe synthetic detergent laundry bar compositions according to the present invention comprising heavy metal ion chelants:

| Ingredients | 6 | 7 | 8 |
|---|---|---|---|
| $C_{12}$ linear alkyl benzene sulfonate (LAS) | 30.0 | 19.0 | 6.75 |
| $C_{12}$–$C_{18}$ fatty acid sulfate | 0.0 | 0.0 | 15.75 |
| $C_{12}$ fatty acid | 0.0 | 0.0 | 1.0 |
| Phosphate (as sodium tripolyphosphate) | 7.0 | 7.0 | 11.6 |
| Sodium carbonate | 25.0 | 12.0 | 10.2 |
| Calcium carbonate | 0.0 | 37.6 | 41.8 |
| Sodium pyrophosphate | 7.0 | 0.0 | 0.0 |
| Coconut monoethanolamide | 2.0 | 0.0 | 0.0 |
| Zeolite A (0.1–1.0 μ) | 5.0 | 0.0 | 1.0 |
| Sodium silicate | 0.0 | 3.0 | 0.0 |
| Carboxymethylcellulose (CMC) | 0.2 | 0.4 | 0.4 |
| Polyacrylate (MW ~1400) | 0.2 | 0.6 | 0.7 |
| Optical brightener | 0.2 | 0.2 | 0.2 |
| Perfume | 0.2 | 0.2 | 0.35 |
| Protease | 0.3 | 0.0 | 0.0 |
| Soil release polymer | 0.5 | 0.15 | 0.6 |
| Calcium sulfate | 1.0 | 0.0 | 4.0 |
| Magnesium sulfate | 1.0 | 3.0 | 0.0 |
| Heavy metal chelant according to Example 12 | 0.2 | 0.0 | 0.0 |
| Heavy metal chelant according to Example 13 | 0.0 | 0.4 | 0.0 |
| Heavy metal chelant according to Example 16 | 0.0 | 0.0 | 0.7 |
| Water | 4.0 | 6.0 | 3.0 |
| Filler* | balance | balance | balance |

*Filler can be selected from convenient materials such as calcium carbonate, talc, clay, silicates and the like.

EXAMPLE 9

Alkylation of Poly(ethyleneimine), MW1800 with 5 moles Alpha-(2-chloroethyl)-omega-methoxy-poly(oxy-1,2-ethanediyl), MW 368

To a 250 ml, three-neck round bottom flask equipped with a magnetic stirring bar, condenser, and thermometer attached to a temperature controlling device (Thermowatch®, I$^2$R) is added poly(ethyleneimine), MW 1800 (Aceto Corp., 30.9 g, 0.017 mol), alpha-(2-chloroethyl)-omega-methoxy-poly(oxy-1,2-ethanediyl), MW 368 (31.6 g, 0.086 mol, prepared as in Example 14), and ethanol (Aaper, 30.2 g, 0.655 mol). The solution is heated at reflux under argon overnight. A $^{13}$C-NMR (D$_2$O) spectrum shows the disappearance of the starting chloride peak at ~43.5 ppm, and also the absence of any ethanol left in the system. (Apparent failure of the condenser.) The orange product (~62 g) is stored as a 50% solution in water.

EXAMPLE 10

Alkylation of Poly(ethyleneimine), MW1800 with 20 Moles of Alpha-(2-chloroethyl)-omega-methoxy-poly(oxy-1,2-ethanediyl), MW 368

To a 250 ml, three-neck round bottom flask equipped with a magnetic stirring bar, condenser, and thermometer attached to a temperature controlling device (Thermowatch®, I$^2$R) is added poly(ethyleneimine), MW 1800 (Aceto Corp., 15.9 g, 0.0088 mol), alpha-(2-chloroethyl)-omega-methoxy-poly(oxy-1,2-ethanediyl), MW 368 (65.1 g, 0.177 mol, prepared as in Example 14), and ethanol (Aaper, 30 g, 0.651 mol). The solution is heated at reflux under argon overnight. A $^{13}$C-NMR (D$_2$O) spectrum shows a sizeable peak for the starting chloride at ~43.5 ppm. The solution is pH ~7 at this point. Enough sodium ethoxide (Aldrich, 25% in ethanol) is added to adjust the pH to ~9.5. Heating at reflux under argon is continued for an additional 3 days. A $^{13}$C-NMR (D$_2$O) spectrum shows no starting chloride peak. The mixture is centrifuged to separate the considerable salt which has formed during the reaction. Solvent is stripped from the supernatant first with a rotary evaporator (~60° C.) and then with a Kugelrohr apparatus (Aldrich) at ~80° C. to afford 30.5 g of brown rubbery material, which is dissolved in water and stored as a 32.7% active solution.

EXAMPLE 11

Synthesis of Alpha-(2-chloroethyl)-omega-methoxy-poly(oxy-1,2-ethanediyl), MW=2018

To a 1L, three-neck round bottom flask equipped with a magnetic stirring bar, condenser, and temperature controller (Thermowatch®, $I^2R$) is added poly(ethylene glycol methyl ether) MW 2000 (Aldrich, 300.0 g, 0.150 mol) under argon. The material is heated to 55° C., at which temperature it is melted and able to be stirred rapidly. Thionyl chloride (Baker, 53.5 g, 0.45 mol) is added in 2 portions to the material over about 30 min. The thermowatch is set to 55° C. overnight. A $^{13}$C-NMR ($D_2O$) is taken which shows no peak at ~60 ppm for unreacted alcohol. A sizable peak at ~43.5 ppm representing chlorinated product ($—CH_2Cl$) is evident. Saturated sodium chloride solution is slowly added to the material until the thionyl chloride is destroyed. The material is taken up in about 200 ml of saturated sodium chloride-solution and extracted with about 500 ml of methylene chloride. The organic layer is dried and then stripped on a Kugelrohr apparatus (Aldrich) at ~80° C. to afford 280 g of the desired material as yellow liquid, which cools to a tan waxy solid.

EXAMPLE 12

Alkylation of Poly(ethyleneimine), MW 1800 with 5 Moles of Alpha-(2-chloroethyl)-omega-methoxy-poly(oxy-1,2-ethanediyl), MW 2018

To a 250 ml, three-neck round bottom flask equipped with a magnetic stirring bar, condenser, and thermometer attached to a temperature controlling device (Thermowatch®, $I^2R$) is added poly(ethyleneimine), MW 1800 (Aceto Corp., 10.0 g, 0.0056 mol), alpha-(2-chloroethyl)-omega-methoxy-poly(oxy-1,2-ethanediyl) MW 2018(56.1 g, 0.028 mol, prepared as in Example 11), and ethanol (Aaper, 40 g, 0.868 mol). The solution is heated at reflux under argon overnight. A $^{13}$C-NMR spectrum ($D_2O$) shows a sizeable peak for the starting chloride at ~43.5 ppm. The pH of the system is ~10 at this point. Heating at reflux is continued overnight. Very little progress in the reaction is seen by NMR. To the solution is added potassium iodide (Baker, 0.5 g, 0.0030 mol). Heating at reflux is continued for 2 nights. A $^{13}$C-NMR ($D_2O$) shows that the starting chloride peak is now barely visible. The ethanol is removed on the rotary evaporator (~60° C.) and a Kugelrohr apparatus (Aldrich) at ~80° C. to afford 61.8 g of soft solid, which is stored as a 35.3% solution in water.

EXAMPLE 13

Alkylation of Poly(ethyleneimine), MW 1800 with Alpha-(2-chloroethyl)-omega-methoxy-poly(oxy-1, 2-ethanediyl). MW=768.4 and Reaction with Sodium Maleate To a 1L, three-neck round bottom flask equipped with a magnetic stirring bar, condenser, and thermometer attached to a temperature controlling device (Thermowatch®, $I^2R$) is added poly(ethyleneimine), MW 1800 (Aceto Corp., 150.0 g, 0.083 mol), alpha-(2-chloroethyl)-omega-methoxy-poly (oxy-1,2-ethanediyl), MW=768.4 (320.2 g, 0.417 mol, prepared as in Example 15), and ethanol (Aaper, 170 g, 3.69 mol). The solution is heated at reflux under argon overnight. A $^{13}$C-NMR ($D_2O$) shows that the starting chloride peak at ~43.5 ppm is extremely small. The ethanol is removed on the rotary evaporator (~60° C.) and a Kugelrohr apparatus (Aldrich) at ~80° C. to afford 370.9 g of soft solid, stored as a 50% solution in water.

Into a 2L, three-neck round bottom flask equipped with a magnetic stirring bar, condenser, and thermometer attached to a temperature controlling device (Thermowatch®, $I^2R$) is added maleic acid (Aldrich, 38.2 g, 0.328 mol) and water (200 g). Sodium hydroxide (Baker, 56 g of 50% in water, 0.700 mol) is added dropwise to the rapidly stirring mixture under argon over ~15 min. The resulting homogeneous solution is heated to 80° C., and the above alkylated poly (ethylene imine) solution is added. The solution is heated at 95° C. under argon for about 40 hours to give an aqueous solution of the desired modified polyethyleneimine having ethoxylated substituents and succinate substituents (as aspartate moieties). A $^{13}$C-NMR ($D_2O$) shows the disappearance of the maleate peak at ~138 ppm and the appearance of a much smaller fumarate peak at ~136 ppm. Similarly, a $^1$H-NMR ($D_2O$) shows the disappearance of the maleate peak at ~6 ppm and the appearance of a very small fumarate peak at ~6.6 ppm. The material is stored as a 35.2% solution in water.

EXAMPLE 14

Synthesis of Alpha-(2-chloroethyl)-omega-methoxy-poly-(oxy-1, 2-ethanediyl), MW=368

To a 1L, three-neck round bottom flask equipped with a magnetic stirring bar, condenser, and temperature controller (Thermowatch®, $I^2R$) is added poly(ethylene glycol methyl ether) MW 350 (Aldrich, 501.7 g, 1.43 mol) under argon. Thionyl chloride (Baker, 256.0 g, 2.15 mol) is added in ~50 ml portions over about 2 hrs., with the temperature climaxing at around 58° C. from the exotherm. After the solution cools to ~25° C., the thermowatch is set to 55° C. overnight. A $^{13}$C-NMR ($D_2O$) is taken which shows a large peak at ~60 ppm for unreacted alcohol. An additional 220 g (1.85 mol) of thionyl chloride is added, and the solution is heated at 50° C. under argon overnight. The peak for unreacted alcohol is now very small, and a sizable peak at ~43.5 ppm representing chlorinated product ($—CH_2Cl$) is evident. Saturated sodium chloride solution is slowly added to the material until the thionyl chloride is destroyed. The material is taken up in about 700 ml of saturated sodium chloride solution and extracted with about 800 ml of methylene chloride. The organic layer is dried and solvent is stripped on a Kugelrohr apparatus (Aldrich) at ~50° C. to afford 430 g of the desired material as a dark brown liquid.

EXAMPLE 15

Synthesis of Alpha-(2-chloroethyl)-omega-methoxy-poly(oxy-1, 2-ethanediyl), MW=768

To a 50 ml, three-neck round bottom flask equipped with a magnetic stirring bar and condenser, and temperature controller (Thermowatch®, $I^2R$) is added poly(ethylene glycol methyl ether) MW 750 (Aldrich, 20.3 g, 0.027 mol), which has been melted in a water bath, and dimethylformamide (Baker, 0.20 g, 0.0027 mol). Thionyl chloride (Baker, 16.4 g, 0.141 mol) is added in 4 portions to the warm material over about 10 min. The thermowatch is set to 55° C., and the solution is heated under argon overnight. A $^{13}$C-NMR (D$_2$O) is taken which shows the complete disappearance of the alcohol peak at ~60 ppm. A sizable peak at ~43.5 ppm representing chlorinated product (—CH$_2$Cl) is evident. Saturated sodium chloride solution is slowly added to the material until the thionyl chloride is destroyed. The material is taken up in about 50 ml of saturated sodium chloride solution and extracted with about 100 ml of methylene chloride. The organic layer is dried on a rotary evaporator at ~60° C. to afford ~35 g of yellow liquid, which cools to an off-white, waxy solid.

EXAMPLE 16

Reaction of Chloro-MPEG, MW 2018 with Poly (ethyleneimine) MW 1800, and subsequent hydroxyethylation Alpha-(2-chloroethyl)-omega-methoxy-poly(oxy-1,2-ethandiyl), MW approximately 2018 (13.1 gm, 0.0065 moles, prepared as in Example 11), poly(ethyleneimine) MW 1800 (Polysciences, Inc., 11.7 gm, 0.0065 moles), and enough deionized water to make a 35% solution by weight are added to a 100 mL, three nick, round bottom flask equipped with a stir bar, a condenser, a thermometer, and a temperature control device (Therm-O-Watch™, I$^2$R), the clear reaction solution is heated overnight at 80° C. under argon. After the reaction is completed, the theoretical amount of 50% sodium hydroxide solution (Baker) is added to neutralize the acid formed. The solution is then placed in 250 mL round bottom flask and stripped on the rotary evaporator at 60° C. and aspirator vacuum. Last traces of water are removed on a Kugelrohr apparatus (Aldrich) under conditions of ~2 mm Hg and 120° C. for 3 hours. A portion of the waxy, yellow product (14.2 gm, 0.004 moles) is weighed into a 100 mL, three neck, round bottom flask equipped with a gas inlet tube with a flitted glass tip, a thermometer, a temperature control device (Therm-O-Watch™, I$^2$R), and a motorized stirrer with a glass shaft and a Teflon blade. The reaction is taken up to about 140° C. under argon, with vigorous stirring. At this point, the ethylene oxide (Liquid Carbonics) is bubbled into the reaction vessel until a weight gain of about 9.9 gm is noted in the product, corresponding to hydroxyethylation of about 80% of the remaining NH functions. The desired modified polyethyleneimine is obtained as a yellow waxy material which has good water solubility.

What is claimed is:

1. A laundry composition comprising:
   a) at least 0.001% to about 5% by weight, of a heavy metal chelant comprising:
      i) a modified polyamine having a backbone of the formula

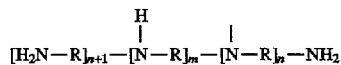

wherein R is C$_2$-C$_{22}$ alkylene, C$_3$-C$_{22}$ alkyl substituted alkylene, —CH$_2$CH(OH)CH$_2$—, —(R$^1$O)$_x$R$^1$—, —CH$_2$CH(OH)CH$_2$O(R$^1$O)$_x$—CH$_2$CH(OH)CH$_2$—, and mixtures thereof; R$^1$ is C$_2$-C$_6$ alkylene, C$_3$-C$_6$ alkyl substituted alkylene, and mixtures thereof; and
      ii) from about 0.5% to less than 45% of the polyamine backbone NH and OH units are substituted by one or more units independently selected from:
         a) units having the formula

—CR$^3$R$^4$R$^5$ wherein each R$^3$, R$^4$, and R$^5$ is independently selected from the group consisting of hydrogen, —(CH$_2$)$_y$(L)$_z$R$^6$, and mixtures thereof provided that one R$^3$, R$^4$, or R$^5$ is not a hydrogen atom, wherein R$^6$ is —CO$_2$H, —C(NH)NH$_2$, —C(SH)S, —C(O)NHOH, —C(NOH)NH$_2$, —CH$_2$P(O)(OH)$_2$, —OP(O)(OH)$_2$, and mixtures thereof; L is —NH—, —S—, and mixtures thereof;
         b) units having the formula —C(O)CH$_2$N(CH$_2$CO$_2$H)$_2$, —C(O)CH$_2$N(CH$_2$CO$_2$H)CH$_2$CH$_2$N(CH$_2$CO$_2$H)$_2$, —(CH$_2$)$_p$CH(CO$_2$H)N(CH$_2$CO$_2$H)$_2$, and mixtures thereof;

m is from 2 to about 700, n is from 0 to about 350, p is from 1 to 20, x is from 1 to 100, y is from 0 to 3, z is 0 or 1; and
   b) at least about 0.1% by weight, of a detersive surfactant selected from the group consisting of anionic, cationic, nonionic, zwitterionic, ampholytic surfactants, and mixtures thereof.

2. A composition according to claim 1 further comprising adjunct ingredients selected from the group consisting of buffers, builders, chelants, filler salts, soil release agents, dispersants, enzymes, enzyme boosters, perfumes, thickeners, clays, reducing bleaches, solvents, and mixtures thereof wherein said composition further comprises less than about 1% available oxygen or available chlorine from a bleaching agent.

3. A composition according to claim 1 further comprising at least about 1% by weight, of a zeolite builder.

4. A laundry composition comprising:
   a) at least 0.001% to about 5% by weight, of a heavy metal chelant comprising:
      i) a modified polyamine having a backbone of the formula;

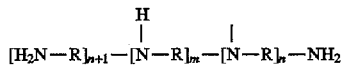

wherein R is C$_2$-C$_{22}$ alkylene, C$_3$-C$_{22}$ alkyl substituted aklylene, —CH$_2$CH(OH)CH$_2$—, —(R$^1$O)$_x$R$^1$—, —CH$_2$CH(OH)CH$_2$O(R$^1$O)$_x$—$_{CH2}$CH(OH)CH$_2$—, and mixtures thereof; R$^1$ is C$_2$-C$_6$ alkylene, C$_3$-C$_6$ alkyl substituted alkylene, and mixtures thereof;
      ii) from about 0.5% to less than 45% of the polyamine backbone N—H units are substituted by —C(O)CH$_2$N(CH$_2$CO$_2$H)$_2$, —C(O)CH$_2$N(CH$_2$CO$_2$H)CH$_2$CH$_2$N(CH$_2$CO$_2$H)$_2$, —(CH$_2$)$_p$CH(CO$_2$H)N(CH$_2$CO$_2$H)$_2$, or units having the formula:

—CR$^3$R$^4$R$^5$ wherein each R$^3$, R$^4$, and R$^5$ is independently selected from the group consisting of hydrogen, —(CH$_2$)$_y$(L)$_z$R$^6$, and mixtures thereof provided that one R$^3$, R$^4$, or R$^5$ is not a hydrogen atom, wherein R$^6$ is —CO$_2$H, —C(NH)NH$_2$, —C(SH)S, —C(O)NHOH, —C(NOH)NH$_2$, —CH$_2$P(O)(OH)$_2$, —OP(O)(OH)$_2$, and mixtures thereof; L is —NH—, —S—, and mixtures thereof;

m is from 2 to about 700, n is from 0 to about 350, p is from 1 to 20, x is from 1 to 100, y is from 0 to 3, z is 0 or 1;
   b) at least about 0.1% by weight, of a detersive surfactant selected from the group consisting of anionic, cationic, nonionic, zwitterionic, ampholytic surfactants, and mixtures thereof; and
   c) the balance carriers and adjunct ingredients, said carriers and adjunct ingredients selected from the group consisting of enzymes, enzyme stabilizers, bleaches, bleach activators, builders, soil release agents, chelants, dispersants, anti-redeposition agents, suds supressors, brighteners, fabric softeners, hydrotropes, processing aids, dyes, pigments, solvents, fillers, and mixtures thereof;

wherein said compositions further comprise less than about 1% available oxygen or available chlorine from a bleaching agent.

* * * * *